(12) United States Patent
Shamis et al.

(10) Patent No.: US 9,491,108 B2
(45) Date of Patent: Nov. 8, 2016

(54) EXTENDED PRIORITY FOR ETHERNET PACKETS

(71) Applicant: MARVELL WORLD TRADE LTD., St. Michael (BB)

(72) Inventors: Michael Shamis, Netanya (IL); Youval Nachum, Holon (IL)

(73) Assignee: Marvell World Trade Ltd., St. Michael (BB)

( * ) Notice: Subject to any disclaimer, the term of this patent is extended or adjusted under 35 U.S.C. 154(b) by 211 days.

(21) Appl. No.: 13/894,952

(22) Filed: May 15, 2013

(65) Prior Publication Data

US 2013/0308648 A1 Nov. 21, 2013

Related U.S. Application Data

(60) Provisional application No. 61/647,164, filed on May 15, 2012, provisional application No. 61/649,554, filed on May 21, 2012.

(51) Int. Cl.
*H04L 12/833* (2013.01)
*H04L 12/46* (2006.01)
(Continued)

(52) U.S. Cl.
CPC ............ *H04L 47/31* (2013.01); *H04L 12/465* (2013.01); *H04L 47/24* (2013.01); *H04L 47/2491* (2013.01)

(58) Field of Classification Search
CPC ..... H04L 12/465; H04L 47/31; H04L 47/24; H04L 47/2491; H04L 12/4641; H04L 12/4645; H04L 49/354; H04L 12/40163; H04L 47/2441; H04L 47/2458

USPC ............. 370/235, 351, 389, 392, 395.42, 370/395.53, 401, 444, 474, 539
See application file for complete search history.

(56) References Cited

U.S. PATENT DOCUMENTS 6,798,746 B1 * 9/2004 Kloth et al. ................. 370/235
7,586,915 B1 * 9/2009 Indiresan et al. ............ 370/392
(Continued)

FOREIGN PATENT DOCUMENTS

| EP | 1 705 840 A1 | | 9/2006 |
|---|---|---|---|
| WO | 2011/113381 | * | 9/2011 |
| WO | WO-2011/113381 A2 | | 9/2011 |

OTHER PUBLICATIONS

Li et al., "Method, Apparatus and System for Mapping Service Instance", Sep. 22, 2011, WO, WO 2011/113381 machine translation.*

(Continued)

*Primary Examiner* — Pao Sinkantarakorn
*Assistant Examiner* — Michael Phillips

(57) ABSTRACT

A network device includes a packet ingress configured to receive packets from a network, and a packet processor. The packet processor is configured to identify a first packet of the received packets as a double VLAN tagged packet including a first priority field associated with a first VLAN tag and a second priority field associated with a second VLAN tag. The packet processor is also configured to assign an extended priority profile to the first packet based on one or more bits of the first priority field and one or more bits of the second priority field, the extended priority profile being among a group of possible extended priority profiles that is larger than any group of possible priority profiles associated with a single VLAN tag of the first packet. The packet processor is further configured to process the first packet according to the assigned extended priority profile.

19 Claims, 11 Drawing Sheets

(51) Int. Cl.
*H04L 12/857* (2013.01)
*H04L 12/851* (2013.01)

(56) References Cited

U.S. PATENT DOCUMENTS

| | | | |
|---|---|---|---|
| 7,606,232 B1* | 10/2009 | Ruben et al. | 370/392 |
| 7,613,209 B1* | 11/2009 | Nguyen et al. | 370/474 |
| 7,697,422 B1* | 4/2010 | Arad et al. | 370/229 |
| 8,830,906 B1* | 9/2014 | Shousterman et al. | 370/328 |
| 2004/0151181 A1* | 8/2004 | Chu et al. | 370/392 |
| 2006/0002370 A1* | 1/2006 | Rabie et al. | 370/351 |
| 2006/0039390 A1* | 2/2006 | Boyd et al. | 370/404 |
| 2006/0146816 A1* | 7/2006 | Jain | 370/389 |
| 2006/0248227 A1* | 11/2006 | Hato et al. | 709/245 |
| 2008/0240113 A1* | 10/2008 | Arad et al. | 370/395.53 |
| 2009/0257739 A1 | 10/2009 | Kanada | |
| 2009/0279552 A1* | 11/2009 | Dong | 370/395.53 |
| 2010/0061379 A1* | 3/2010 | Parandekar et al. | 370/395.53 |
| 2010/0329263 A1 | 12/2010 | Tischer et al. | |
| 2012/0020206 A1 | 1/2012 | Busi et al. | |
| 2012/0027024 A1* | 2/2012 | Liang | 370/412 |
| 2012/0106549 A1* | 5/2012 | Yousefi et al. | 370/392 |
| 2012/0201138 A1* | 8/2012 | Yu et al. | 370/235 |
| 2013/0287027 A1 | 10/2013 | Ra et al. | |
| 2014/0043972 A1* | 2/2014 | Li et al. | 370/230 |
| 2014/0105602 A1* | 4/2014 | Kawamura et al. | 398/66 |
| 2014/0226488 A1 | 8/2014 | Shamis et al. | |

OTHER PUBLICATIONS

Li et al., "Method, Apparatus and System for Mapping Service Instance", Sep. 22, 2011, WO, WO 2011/113381, Table 9, human translation.*

IEEE Std 802.1Q—2011 (Revision of IEEE Std.802.1Q-2005), "IEEE Standard for Local and Metropolitan Area Networks—Media Access Control (MAC) Bridges and Virtual Bridge Local Area Networks," *The Institute of Electrical and Electronics Engineers, Inc.*, Aug. 31, 2011, 1,365 pages.

Trill: Fine-Grained Labeling, Internet-Draft, Internet Engineering Task Force, Eastlake et al., Dec. 8, 2011, 21 pages.

IEEE P802.1aq/D4.6, Draft Amendment to IEEE Std 802.1Q-2011, "IEEE Draft Standard for Local and Metropolitan Area Networks—Media Access Control (MAC) Bridges and Virtual Bridged Local Area Networks—Amendment XX: Shortest Path Bridging," *The Institute of Electrical and Electronics Engineers, Inc.*, Feb. 10, 2012, 363 pages.

IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, Aug. 17, 2005, 69 pages.

International Search Report and Written Opinion in International Application No. PCT/IB2013/001581, dated Oct. 28, 2013 (9 pages).

International Preliminary Report on Patentability in International Application No. PCT/IB2013/001581, dated Nov. 27, 2014 (8 pages).

Non-Final Office Action in U.S. Appl. No. 14/252,465, mailed on Jan. 13, 2016 (78 pages).

* cited by examiner

EXTENDED PRIORITY FOR ETHERNET PACKETS

CROSS-REFERENCE TO RELATED APPLICATION

This application claims the benefit of U.S. Provisional Patent Application No. 61/647,164, entitled "Extended Priority" and filed on May 15, 2012, and of U.S. Provisional Patent Application No. 61/649,554, entitled "Extended Priority" and filed on May 21, 2012, the disclosures of which are hereby incorporated by reference herein.

FIELD OF TECHNOLOGY

The present disclosure relates generally to communication networks and, more particularly, to communication networks in which Ethernet packets are transmitted.

BACKGROUND

Efficient network management generally requires the ability to segregate different types of network traffic, with higher priority traffic being processed differently than lower priority traffic. To this end, various communication protocols currently implemented within Ethernet-based networks define Layer 2 priority fields that specify the quality of service (QoS) level to which a packet is entitled, and therefore dictate the manner in which the packet should be processed. As cloud computing becomes more prevalent, however, data center networks are typically required to support a rapidly increasing number of tenants, with a corresponding increase in the number of traffic types. As a result, efficient network management of modern data centers may require the ability to segregate a larger number of different traffic types.

SUMMARY

In an embodiment, a network device includes a packet ingress configured to receive packets from a network, and includes a packet processor. The packet processor is configured to identify a first packet of the received packets as a double virtual local area network (VLAN) tagged packet including (i) a first priority field associated with a first VLAN tag and (ii) a second priority field associated with a second VLAN tag. The packet processor is also configured to assign an extended priority profile to the first packet based on (i) one or more bits of the first priority field of the first packet and (ii) one or more bits of the second priority field of the first packet, the extended priority profile being among a group of possible extended priority profiles that is larger than any group of possible priority profiles associated with a single VLAN tag of the first packet. The packet processor is further configured to process the first packet according to the assigned extended priority profile.

In some of these embodiments, the network device comprises any combination of the following features.

The network device further comprises a plurality of queues, and the packet processor is configured to process the first packet according to the assigned extended priority profile at least in part by selecting one of the plurality of queues based on the assigned extended priority profile, and sending the first packet, a portion of the first packet, or a packet descriptor associated with the first packet to the selected queue.

Each profile in the group of possible extended priority profiles corresponds to a different one of the plurality of queues.

The group of possible extended priority profiles is larger than a combination of (i) a first group of possible priority profiles associated with the first priority field and (ii) a second group of possible priority profiles associated with the second priority field.

The first group of possible priority profiles consists of $2^M$ priority profiles, where M is an integer greater than zero, the second group of possible priority profiles consists of $2^N$ priority profiles, where N is an integer greater than zero, and the group of possible extended priority profiles consists of $2^{(M+N)}$ priority profiles.

The packet processor is configured to assign the extended priority profile to the first packet at least in part by mapping the one or more bits of the first priority field of the first packet and the one or more bits of the second priority field of the first packet to the extended priority profile.

The packet processor is configured to map the one or more bits of the first priority field of the first packet and the one or more bits of the second priority field of the first packet to the extended priority profile at least in part by mapping the one or more bits of the first priority field of the first packet and the one or more bits of the second priority field of the first packet to extended priority bits, and mapping the extended priority bits to the extended priority profile.

The packet processor is configured to assign the extended priority profile to the first packet further by overwriting at least a portion of the first priority field of the first packet and at least a portion of the second priority field of the first packet with new bit values representing the extended priority profile.

The assigned extended priority profile corresponds to a priority level indicated by a first set of one or more bits distributed among at least one of (i) the one or more bits of the first priority field of the first packet and (ii) the one or more bits of the second priority field of the first packet, and to a priority sub-level indicated by a second set of one or more bits distributed among at least one of (i) the one or more bits of the first priority field of the first packet and (ii) the one or more bits of the second priority field of the first packet.

The packet ingress is configured to receive Ethernet packets from the network, and the packet processor is configured to identify the first packet as a double VLAN tagged packet at least in part by identifying the first packet as one of (i) a Transparent Interconnection of Lots of Links (TRILL) packet, (ii) a Shortest Path Bridging (SPB) packet, or (iii) an IEEE 802.1ad packet.

The packet processor is configured to identify the first packet as a double VLAN tagged packet at least in part by determining that the first packet was received via a port corresponding to double VLAN tagged packets.

The network device further comprises a packet egress, the packet ingress is configured to receive the packets from a legacy network that is not configured to support the extended priority profile, and the packet processor is further configured to transmit the first packet, via the packet egress, to a non-legacy network that is configured to support the extended priority profile.

At least a portion of the packet processor resides within the packet ingress.

In another embodiment, a method in a network device coupled to a network includes receiving a packet from the network, identifying the packet as a double VLAN tagged packet including (i) a first priority field associated with a first VLAN tag and (ii) a second priority field associated with a second VLAN tag, and assigning an extended priority profile to the packet based on (i) one or more bits of the first priority field of the packet and (ii) one or more bits of the second priority field of the packet, the extended priority profile being among a group of possible extended priority profiles that is larger than any group of possible priority profiles associated with a single VLAN tag of the packet. The method also includes processing the packet according to the assigned extended priority profile.

In some of these embodiments, the method comprises any combination of the following features.

Processing the packet according to the assigned extended priority profile includes selecting one of a plurality of queues based on the assigned extended priority profile, each queue of the plurality of queues corresponding to a different one of the possible extended priority profiles, and sending the packet, a portion of the packet, or a packet descriptor associated with the packet to the selected queue.

Assigning an extended priority profile to the packet includes assigning the extended priority profile from among a group of possible extended priority profiles that is larger than a combination of (i) a first group of possible priority profiles associated with the first priority field and (ii) a second group of possible priority profiles associated with the second priority field.

Assigning an extended priority profile to the packet includes mapping the one or more bits of the first priority field of the packet and the one or more bits of the second priority field of the packet to the extended priority profile.

Assigning an extended priority profile to the packet includes assigning an extended priority profile that corresponds to a priority level indicated by a first set of one or more bits distributed among at least one of (i) the one or more bits of the first priority field of the packet and (ii) the one or more bits of the second priority field of the packet, and to a priority sub-level indicated by a second set of one or more bits distributed among at least one of (i) the one or more bits of the first priority field of the packet and (ii) the one or more bits of the second priority field of the packet.

Receiving a packet from the network includes receiving an Ethernet packet from the network, and identifying the packet as a double VLAN tagged packet includes identifying the Ethernet packet as one of (i) a TRILL packet, (ii) an SPB packet, or (iii) an IEEE 802.1ad packet.

In another embodiment, a network device includes a packet ingress configured to receive packets from a network, and includes a packet processor. The packet processor is configured to identify a first packet of the received packets as a double VLAN tagged packet with an extended priority profile, and determine, based on P bits distributed among (i) M bits of a first priority field associated with a first VLAN tag of the first packet and (ii) N bits of a second priority field associated with a second VLAN tag of the first packet, the extended priority profile of the first packet from among a group of possible extended priority profiles that is (i) larger than a first group of possible priority profiles associated with the first priority field and (ii) larger than a second group of possible priority profiles associated with the second priority field. The packet processor is also configured to process the first packet according to the determined extended priority profile.

In some of these embodiments, the network device comprises any combination of the following features.

The packet processor is configured to determine the extended priority profile of the first packet based on P bits that include (i) the M bits of the first priority field and (ii) the N bits of the second priority field.

The packet processor is configured to determine the extended priority profile of the first packet from among a group of $2^{(M+N)}$ possible extended priority profiles.

The packet processor is configured to identify the first packet of the received packets as a TRILL packet associated with an extended priority profile, and determine the extended priority profile of the TRILL packet based on P bits distributed among (i) M bits of a first priority field associated with a first VLAN tag within a link header of the TRILL packet and (ii) N bits of a second priority field associated with a second VLAN tag within a TRILL header of the TRILL packet.

The packet processor is configured to identify the first packet of the received packets as an IEEE 802.1ad packet associated with an extended priority profile, and determine the extended priority profile of the IEEE 802.1ad packet based on P bits distributed among (i) M bits of a first priority field associated with a customer VLAN tag of the IEEE 802.1ad packet and (ii) N bits of a second priority field associated with a service VLAN tag of the IEEE 802.1ad packet.

In another embodiment, a method in a network device includes receiving a packet from a network, identifying the packet as a double VLAN tagged packet with an extended priority profile, and determining, based on P bits distributed among (i) M bits of a first priority field associated with a first VLAN tag of the packet and (ii) N bits of a second priority field associated with a second VLAN tag of the packet, the extended priority profile of the packet from among a group of possible extended priority profiles that is (i) larger than a first group of possible priority profiles associated with the first priority field and (ii) larger than a second group of possible priority profiles associated with the second priority field. The method also includes processing the packet according to the determined extended priority profile.

In some of these embodiments, the method comprises any combination of the following features.

Determining the extended priority profile based on P bits includes determining the extended priority profile based on P bits that include (i) the M bits of the first priority field and (ii) the N bits of the second priority field.

Determining the extended priority profile includes determining the extended priority profile from among a group of $2^{(M+N)}$ possible extended priority profiles.

Identifying the packet as a double VLAN tagged packet with an extended priority profile includes identifying the packet as a TRILL packet associated with an extended priority profile, and determining the extended priority profile of the packet based on P bits includes determining the extended priority profile of the TRILL packet based on P bits distributed among (i) M bits of a first priority field associated with a first VLAN tag within a link header of the TRILL packet and (ii) N bits of a second priority field associated with a second VLAN tag within a TRILL header of the TRILL packet.

Identifying the packet as a double VLAN tagged packet with an extended priority profile includes identifying the packet as an IEEE 802.1ad packet associated with an extended priority profile, and determining the extended priority profile of the packet based on P bits includes determining the extended priority profile of the IEEE 802.1ad packet based on P bits distributed among (i) M bits of a first priority field associated with a customer VLAN tag of the IEEE 802.1ad packet and (ii) N bits of a second priority field associated with a service VLAN tag of the IEEE 802.1ad packet.

Determining the extended priority profile includes determining an extended priority profile that corresponds to a priority level indicated by a first set of one or more bits distributed among at least one of (i) the M bits of the first priority field and (ii) the N bits of the second priority field, and to a priority sub-level indicated by a second set of one or more bits distributed among at least one of (i) the M bits of the first priority field and (ii) the N bits of the second priority field.

In another embodiment, a network includes a plurality of network devices each configured to receive a plurality of packets each having two or more priority fields associated with two or more respective VLAN tags, and to process received packets according to an extended priority profile selected from a first set of possible extended priority profiles. The first set of possible extended priority profiles includes more profiles than are provided by any single field of the two or more priority fields associated with the two or more respective VLAN tags.

In some of these embodiments, the network comprises any combination of the following features.

Each network device in the plurality of network devices is associated with a first virtual domain corresponding to the set of possible extended priority profiles, and at least one network device in the plurality of network devices is coupled to a network device associated with a second virtual domain, wherein the second virtual domain corresponds to a second set of possible extended priority profiles different than the first set of possible extended priority profiles, and wherein the second set of possible extended priority profiles includes more profiles than are provided by any single field of the two or more priority fields associated with the two or more respective VLAN tags.

Each network device in the plurality of network devices is associated with a first virtual domain corresponding to the set of possible extended priority profiles, and at least one network device in the plurality of network devices is coupled to a network device associated with a second virtual domain, wherein the second virtual domain corresponding to a set of possible priority profiles provided by only one of the two or more priority fields.

The plurality of packets each having two or more priority fields associated with two or more respective VLAN tags includes one or more of (i) TRILL packets, (ii) SPB packets, or (iii) IEEE 802.1ad packets.

In another embodiment, a method in a network includes receiving, at each of a plurality of network devices in the network, a respective plurality of packets. Each packet has two or more priority fields associated with two or more respective VLAN tags. The method also includes processing, at each of the plurality of network devices in the network, received packets according to an extended priority profile selected from a first set of possible extended priority profiles. The first set of possible extended priority profiles includes more profiles than are provided by any single field of the two or more priority fields associated with the two or more respective VLAN tags.

In one such embodiment, receiving, at each of a plurality of network devices in the network, a respective plurality of packets includes receiving a respective plurality of packets that includes one or more of (i) TRILL packets, (ii) SPB packets, or (iii) IEEE 802.1ad packets.

In another embodiment, a network device includes a memory, a packet ingress configured to receive packets from a network, and a packet processor. The packet processor is configured to identify a first packet of the received packets as a packet having an extended priority profile designated by (i) one or more bits of a first priority field associated with a first VLAN tag of the first packet and (ii) one or more bits of a second priority field associated with a second VLAN tag of the first packet. The packet processor is also configured to map the extended priority profile to a priority profile associated with the first VLAN tag, store in the memory one or more bit values needed to reconstruct the extended priority profile designated in the first packet, and process the first packet according to the priority profile associated with the first VLAN tag.

In some of these embodiments, the network device comprises any combination of the following features.

The packet processor is further configured to, after the packet processor processes the first packet according to the priority profile associated with the first VLAN tag, cause the first packet to be forwarded to another network device with (i) bits of the first priority field being set to bit values that correspond to the priority profile associated with the first VLAN tag, and (ii) bits of the second priority field being set to the one or more bit values needed to reconstruct the extended priority profile designated in the first packet.

The packet processor is further configured to, after the packet processor processes the first packet according to the priority profile associated with the first VLAN tag, reconstruct the extended priority profile of the first packet using (i) bit values that correspond to the priority profile associated with the first VLAN tag and (ii) the one or more bit values needed to reconstruct the extended priority profile designated in the first packet.

The network device further comprises a plurality of queues, and the packet processor is configured to process the packet according to the priority profile associated with the first VLAN tag at least in part by selecting one of the plurality of queues based on the priority profile associated with the first VLAN tag, and sending the packet, a portion of the packet, or a packet descriptor associated with the packet to the selected queue.

The packet processor is configured to identify the first packet of the received packets as a packet having an extended priority profile designated by (i) all bits of the first priority field associated with the first VLAN tag and (ii) all bits of the second priority field associated with the second VLAN tag.

In another embodiment, a method in a network device coupled to a network includes receiving a packet from the network, identifying the packet as a packet having an extended priority profile designated by (i) one or more bits of a first priority field associated with a first VLAN tag of the packet and (ii) one or more bits of a second priority field associated with a second VLAN tag of the packet, mapping the extended priority profile to a priority profile associated with the first VLAN tag, storing, in a memory, one or more bit values needed to reconstruct the extended priority profile designated in the packet, and processing the packet according to the priority profile associated with the first VLAN tag.

In some of these embodiments, the method comprises any combination of the following features.

The method further comprises, after processing the packet according to the priority profile associated with the first VLAN tag, causing the packet to be forwarded to another network device with (i) bits of the first priority field being set to bit values that correspond to the priority profile associated with the first VLAN tag, and (ii) bits of the second priority field being set to the one or more bit values needed to reconstruct the extended priority profile designated in the packet.

The method further comprises, after processing the packet according to the priority profile associated with the first VLAN tag, reconstructing the extended priority profile of the packet using (i) bit values that correspond to the priority profile associated with the first VLAN tag and (ii) the one or more bit values needed to reconstruct the extended priority profile designated in the packet.

Processing the packet according to the priority profile associated with the first VLAN tag includes selecting one of a plurality of queues based on the priority profile associated with the first VLAN tag, and sending the packet, a portion of the packet, or a packet descriptor associated with the packet to the selected queue.

Identifying the packet as a packet having an extended priority profile includes identifying the packet as a packet having an extended priority profile designated by (i) all bits of the first priority field associated with the first VLAN tag and (ii) all bits of the second priority field associated with the second VLAN tag.

DETAILED DESCRIPTION

Figure 1:
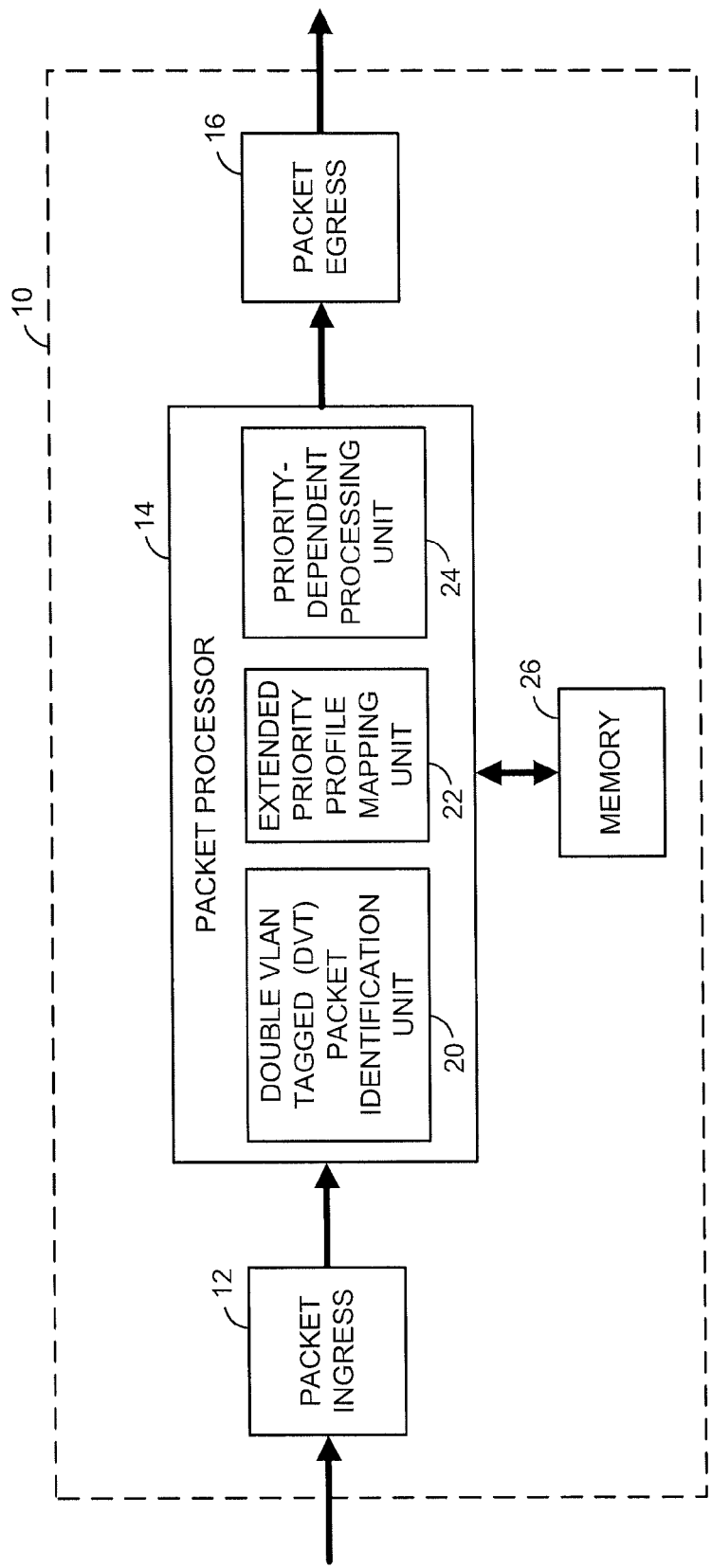
FIG. 1 is a block diagram of an example network device that implements packet processing techniques of the present disclosure, according to an embodiment.

In order to facilitate efficient network management, the Institute of Electrical and Electronics Engineers (IEEE) 802.1Q Standard defines a three-bit priority field located within a virtual local area network (VLAN) tag of an Ethernet packet, with the value of the three priority bits specifying one of eight possible Layer 2 priority profiles for the packet. Moreover, some communication protocols utilized in an Ethernet infrastructure specify two distinct, three-bit Layer 2 priority fields for each packet, with each priority field being associated with a different VLAN tag. For example, the IEEE 802.1ad Standard defines a "QinQ" packet format that includes an outer VLAN ("service VLAN") tag having a three-bit priority field, and an inner VLAN ("customer VLAN") tag having another three-bit priority field. As another example, the Shortest Path Bridging (SPB) protocol defined by the IEEE 802.1aq Standard defines packets that are encapsulated at the edge in tagged IEEE 802.1Q/802.1ad "QinQ" frames. As still another example, the Transparent Interconnection of Lots of Links (TRILL) Standard provided by the Internet Engineering Task Force (IETF) defines a packet format that includes an outer VLAN tag in the link header that includes a three-bit priority field, and an inner VLAN tag in the TRILL header that includes another three-bit priority field. For each of these various types of packets, however, conventional network devices consider only a single VLAN tag priority when processing a given packet, and therefore process each packet according to one of only eight possible Layer 2 priority profiles. For example, conventional network devices process IEEE 802.1ad packets according to the priority indicated in the service VLAN tag only, or according to the priority specified in the customer VLAN tag only, but not according to both priorities.

In embodiments described below, network devices (e.g., switching devices) are configured to support a number of different Layer 2 priority profiles that is greater than would be available using conventional networking technologies. According to various embodiments, the "priority profile" of a packet dictates how the packet is to be processed in any of multiple different ways, such as whether the packet may be dropped, the maximum latency allowed for the packet, or any of various scheduling parameters for the packet, for example. In one embodiment, bits within a first priority field associated with a first VLAN tag, and bits within a second priority field associated with a second, different VLAN tag, are collectively utilized as a single "extended" priority field. For convenience, the bits of a conventional Layer 2 priority field within a single VLAN tag are at times referred to herein as a "VLAN priority tag" or "VPT," while the bits within two VPTs that are used to represent a Layer 2 extended priority field are at times collectively referred to herein as a "double VLAN priority tag" or "DVPT."

In some embodiments, the increased number of bits in the extended priority field (DVPT) allows compatible network devices to provide at least twice as many, and in some embodiments well over twice as many, Layer 2 quality of service (QoS) profiles as are provided by conventional devices that only examine the priority of single VLAN tags individually. In one embodiment where a packet includes two Layer 2, three-bit VPTs that are capable of representing up to $2^3$ (eight) different priority profiles each, for example, the six total bits of the two VPTs are collectively utilized as a DVPT that represents up to $2^6$ (64) different priority profiles. In various embodiments and/or scenarios, a network device may map two or more VPTs to a single extended priority profile, map the extended priority profile to a single VLAN tag priority profile, and/or change the extended priority profile to a new extended priority profile, depending, for example, on where the network device is situated within the network (e.g., as a core/backbone device, or as an edge device).

By supporting an increased number of Layer 2 priority profiles, networks and network devices may more efficiently manage and control a more varied collection of different traffic types, without necessarily requiring that any Layer 3 priority information be examined within each packet. In one embodiment, for example, devices are able to support an increased number of priority profiles for Ethernet packets even without examining the Layer 3, Differentiated Services Code Point (DSCP, or DiffServ) field of the Ethernet packets.

FIG. 1 is a block diagram of an example network device 10 (e.g., a network switch such as a bridge) that implements packet processing techniques of the present disclosure, according to an embodiment. In this embodiment, the network device 10 includes a packet ingress 12, a packet processor 14 coupled to the packet ingress 12, and a packet egress 16 coupled to the packet processor 14. In an embodiment, the packet ingress 12 is coupled to one or more physical ports (not seen in FIG. 1) via which the packet ingress 12 receives packets from a network. Similarly, in an embodiment, the packet egress 16 is coupled to one or more physical ports (not seen in FIG. 1) via which the packet egress 16 forwards packets to other network devices in a network. In one embodiment where the network device 10 is an edge device, for example, the packet ingress 12 receives packets from a first network, and the packet egress 16 forwards at least some of the received packets to a second, different network. In another example embodiment where the network device 10 is a core device rather than an edge device, the packet ingress 12 receives packets from, and the packet egress forwards at least some of the received packets to, devices within the same network. In an embodiment, the network device 10 resides within an Ethernet-based network, and processes Ethernet packets.

The packet ingress 12 and the packet egress 16 each include one or more processing units (not seen in FIG. 1) configured to process a packet received by the network device 10, in an embodiment. For ease of explanation, references herein to a "packet" may refer to the packet itself, to a packet descriptor associated with the packet, or to a different suitable data unit corresponding to the packet (such as the packet header, a portion of the packet header, etc.). In various embodiments, the processing units within the packet ingress 12 include one or more of a tunnel termination interface (TTI) classification unit, an ingress policy unit, a bridge engine, an ingress policer unit, etc., and the processing units within the packet egress 16 include one or more of an egress filtering unit, a Layer 2 (and/or Layer 3) replication unit, a traffic shaping unit, a scheduling unit, an egress policy unit, an egress policer unit, etc. In one embodiment, the processing units of the packet ingress 12 are processing engines that are arranged in a series configuration within an ingress pipeline, and the processing units of the packet egress 16 are processing engines that are arranged in a series configuration within an egress pipeline (as in the Prestera® family of packet processors available from Marvell®, for example). Alternatively, the respective processing units correspond to portions of code executed in a pipeline of programmable processing units, such as a dataflow pipeline, that define a network or packet processor (as in the Xelerated® family of dataflow network processors available from Marvell®, for example), or are functional program modules of one or more software-driven packet and/or network processors. For simplicity of explanation, the following is described in the context of ingress and egress pipelines defined by separate processing engines, although the principles described herein are equally applicable to other suitable processor architectures for switches, and the switch architecture is not to be construed as being limited to any particular architectural design.

Generally, the packet processor 14 performs, for at least some packets received via packet ingress 12, one or more special processing operations that relate to an extended priority profile. To this end, the packet processor 14 of the example network device 10 includes a double VLAN tagged (DVT) packet identification unit 20, an extended priority profile mapping unit 22, and a priority-dependent processing unit 24. In order to determine which packets should receive the special priority processing operations, in an embodiment, the DVT packet identification unit 20 first identifies which of the received packets conform to a double VLAN tagged packet format. As used herein, the term "double VLAN tagged packet" or "DVT packet" is used to refer to a packet having a format that includes (e.g., in the packet header) at least two distinct VPTs (i.e., at least two separate Layer 2 priority fields, each of which is associated with a different VLAN tag). As noted above, for example, double VLAN tagged packets include (but are not limited to) IEEE 802.1ad packets, SPB packets, and TRILL packets. One example of a double VLAN tagged packet that may be processed by the packet processor 14 is described in more detail below in connection with FIG. 2.

To identify a received packet as a double VLAN tagged packet, in one embodiment, the DVT packet identification unit 20 determines whether the packet conforms to a protocol known to have a double VLAN tagged format, such as an IEEE 802.1ad, SPB, or TRILL protocol (e.g., by examining one or more header fields of the packet). In an alternative embodiment, the DVT packet identification unit 20 identifies a received packet as a double VLAN tagged packet by identifying the physical port on which the packet was received by the network device 10. For example, in one embodiment and/or scenario, the network device 10 is preconfigured such that the DVT packet identification unit 20 is aware a priori that particular physical ports will only receive packets conforming to a certain protocol. In another example embodiment/scenario, the network device 10 is preconfigured such that the DVT packet identification unit 20 is aware a priori that particular VLANs correspond to packets that conform to a certain protocol. In still other embodiments, the DVT packet identification unit 20 identifies received packets as double VLAN tagged packets using any other suitable technique.

Packets identified as double VLAN tagged packets by the DVT packet identification unit 20 are provided to the extended priority profile mapping unit 22. In an embodiment, the extended priority profile mapping unit 22 selectively maps bits from two or more VPTs of a packet to an extended priority profile, maps bits of a DVPT of a packet to a priority profile associated with a single, conventional VLAN tag, or leaves the (extended or conventional) priority profile of a packet unchanged. The specific operation of the extended priority profile mapping unit 22 depends, in some embodiments, on factors such as whether the network device 10 is configured as an edge device between two networks, the type of network from which the network device 10 receives packets and/or the type of network to which the network device 10 forwards packets (e.g., a legacy network that does not support Layer 2 extended priority profiles, or a non-legacy network that does support Layer 2 extended priority profiles), whether the network device 10 is configured as a core/backbone device within a non-legacy network, whether an extended priority profile mode is currently enabled, and/or other factors. In one embodiment and scenario where the network device 10 is an edge device that receives double VLAN tagged packets from a legacy network and forwards the packets to a non-legacy network, for example, the extended priority profile mapping unit 22 maps bit values from both VPTs to an extended priority profile for the packet. This and other embodiments/scenarios, and various units within the extended priority profile mapping unit 22, are described in more detail below with reference to FIG. 4.

After the extended priority profile mapping unit 22 has performed priority profile mapping, the priority-dependent processing unit 24 processes the packet in accordance with the new priority profile of the packet. In one embodiment and scenario where the extended priority profile mapping unit 22 maps bits of two VPTs to an extended priority profile, for example, the priority-dependent processing unit 24 enforces the QoS level corresponding to the extended priority profile by sending the packet to the appropriate queue (or determining whether a packet should be dropped, etc.). In another example embodiment/scenario, the priority-dependent processing unit 24 uses the extended priority profile to determine an address of another network device to which the packet should be forwarded. In still other example embodiments/scenarios, the priority-dependent processing unit 24 performs other types of operations based on the extended priority profile.

In the example network device 10, the packet processor 14 is coupled to a memory 26, such as a dynamic random access memory (DRAM), for example, or other suitable memory. The memory 26 can serve different purposes according to various different embodiments. In one embodiment, for example, the memory 26 stores packet descriptors or packet headers corresponding to packets received via packet ingress 12, or copies of the entire packets, and the packet processor 14 is configured both to read from the memory 26 and to write to the memory 26). In one embodiment where the extended priority profile mapping unit 22 maps DVPT bits to bits of a single VPT, the memory 26 stores bit values that allow the original DVPT bits to be reconstructed at a later time in the network device 10, or at a subsequent device in a network to which the network device 10 is coupled. In some embodiments, the memory 26 stores these bit values by overwriting portions of the packet header or packet descriptor.

In an embodiment, provided for ease of understanding, the packet ingress 12, packet processor 14 and/or packet egress 16 are implemented in hardware, in a processor that executes firmware and/or software instructions, or a combination thereof. In some embodiments, the packet ingress 12, packet processor 14 and packet egress 16 in the example network device 10 are implemented in whole or in part in hardware and process the packet substantially at wire speed. For example, all of the units are implemented in a hardware pipeline architecture within an application specific integrated circuit (ASIC), in an embodiment. In other embodiments, a different type of integrated circuit is used such as a programmable logic device (PLD), a field programmable gate array (FPGA), a programmable logic array (PLA), a custom integrated circuit, etc. In some embodiments, the units of the example network device 10 are implemented on multiple different integrated circuits that are coupled together. In some embodiments, as noted above, still other architectures and/or platforms are utilized, such as portions of code executed in a pipeline of programmable processing units, or functional program modules of one or more software-driven packet and/or network processors, for example.

While FIG. 1 shows the packet processor 14 as separate from the packet ingress 12 and packet egress 16 for clarity, in some embodiments the units of the packet processor 14 are distributed within the packet ingress 12, within the packet egress 16, or within both the packet ingress 12 and the packet egress 16. In one embodiment, for example, an ingress policy unit (not seen in FIG. 1) within the packet ingress 12 performs the functions of the DVT packet identification unit 20 and the extended priority profile mapping unit 22, and the priority-dependent packet processing unit 24 is an egress QoS enforcement unit included in the packet egress 16. In another example embodiment, DVT packet identification unit 20 and extended priority profile mapping unit 22 are located before a policy unit in packet ingress 12, such that ternary content-addressable memory (TCAM) look-ups in the policy unit can utilize the result of any mappings performed by the extended priority profile mapping unit 22. In still other embodiments, the locations of some or all units/engines in packet ingress 12, packet processor 14, and/or packet egress 16 are configurable, allowing a particular application to define the sequence of packet processing. For example, a plurality of central processing units (CPUs) are each configured to provide programmable packet processing functionality for a respective unit/engine (or a respective group of units/engines) as a packet proceeds from ingress to egress, in an embodiment.

Figure 2:
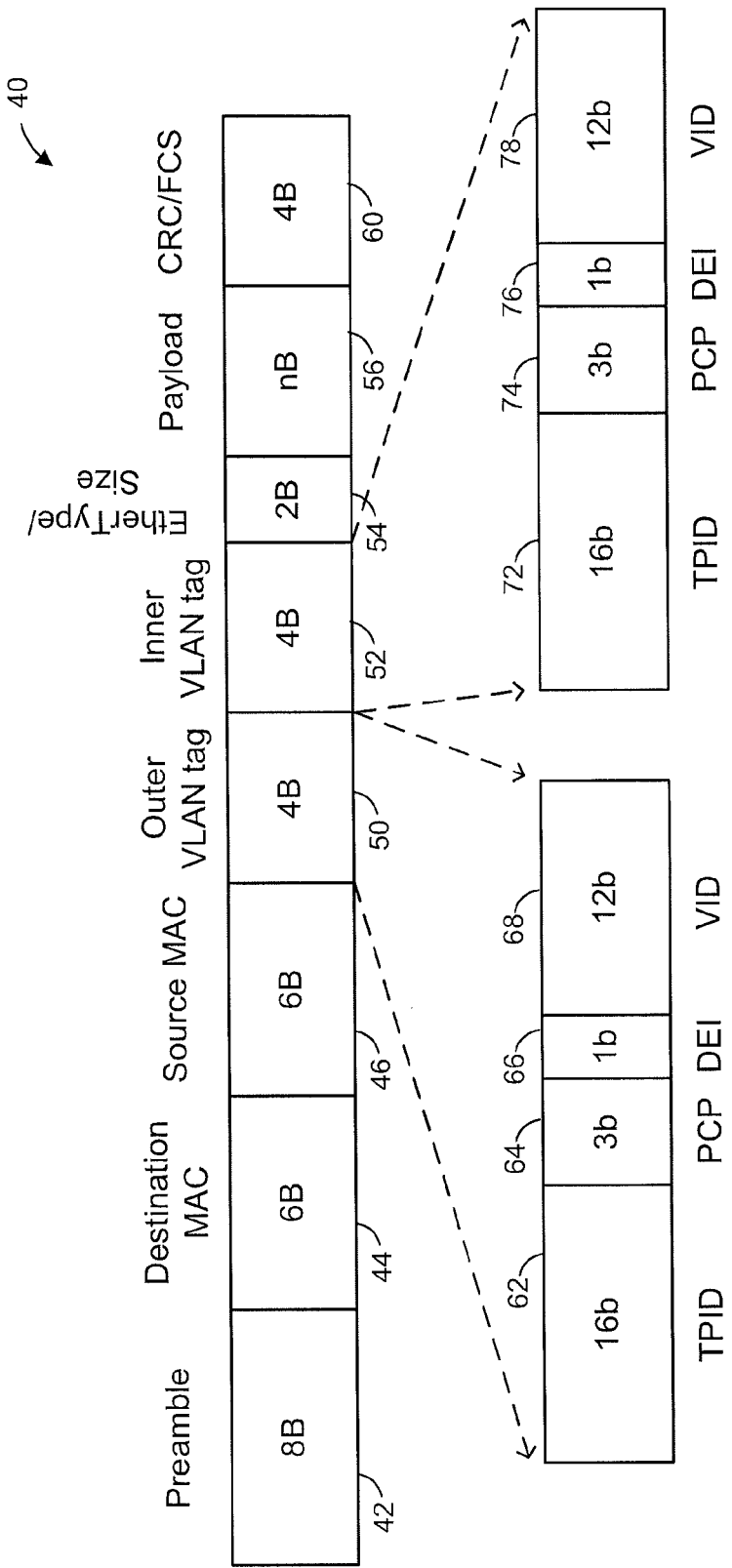
FIG. 2 is a diagram of an example double VLAN tagged packet processed by the example network device of FIG. 1, according to one embodiment and scenario.

FIG. 2 is a diagram of an example double VLAN tagged packet 40 processed by the example network device 10 of FIG. 1, according to one embodiment and scenario. Excepting the capability to use multiple VPTs as a DVPT indicating an extended priority profile, the example double VLAN tagged packet 40 conforms to the IEEE 802.1ad Standard, in one embodiment, and includes an eight-byte preamble 42, a six-byte destination MAC field 44, a six-byte source MAC field 46, a four-byte outer (service) VLAN tag 50, a four-byte inner (customer) VLAN tag 52, a two-byte EtherType/size field 54, an n-byte payload 56 that includes data, and a four-byte cyclic redundancy check (CRC)/frame check sequence (FCS) field 60 for error detection. The outer VLAN tag 50 includes a 16-bit tag protocol identifier (TPID) field 62, a three-bit priority code point (PCP) field 64, a one-bit drop eligible indicator (DEI) field 66, and a 12-bit VLAN identifier (VID) field 68. Similarly, the inner VLAN tag 52 includes a 16-bit TPID field 72, a three-bit PCP field 74, a one-bit DEI field 76, and a 12-bit VID field 78. The PCP field 64 serves as a VPT associated with the outer VLAN tag 50, while the PCP field 74 serves as a VPT associated with the inner VLAN tag 52. In one embodiment, all six bits of the two PCP fields 64, 74 serve as the DVPT used to indicate an extended priority profile. In other embodiments, the DVPT includes less than six bits distributed among the two PCP fields 64, 74.

In various embodiments, the DVT packet identification unit 20 of FIG. 1 identifies the packet 40 as a double VLAN tagged packet by examining the EtherType/size field 54, by directly determining that the packet 40 includes two VPTs (i.e., PCP field 64 and PCP field 74), or by a different suitable technique. In one embodiment and scenario, the extended priority profile mapping unit 22 maps the DVPT bits (i.e., some or all bits of the two PCP fields 64, 74) to a new set of bit values that corresponds to a particular extended priority profile, and overwrites the bits of PCP fields 64, 74 with the new values. In another embodiment and scenario, the packet processor 14 is aware that the packet 40 has been received from another device in the same Layer 2 DVPT domain as the network device 10 (i.e., from a device that utilizes the same set of extended priority profiles as network device 10), and the extended priority profile mapping unit 22 therefore leaves the bit values unchanged. In still another embodiment and scenario, the extended priority profile mapping unit 22 maps DVPT bits indicating an extended priority profile to bit values for a single VPT in packet 40 (i.e., to bit values for PCP field 64, or to bit values for PCP field 74), and overwrites only those bits with the new values.

While the example double VLAN tagged packet 40 generally conforms to the IEEE 802.1ad packet, in other embodiments and/or scenarios the network device 10 of FIG. 1 instead processes different types of double VLAN tagged packets, such as TRILL packets or SPB packets. Moreover, while the example double VLAN tagged packet 50 includes only two VPTs (PCP field 64 and PCP field 74), in other embodiments and/or scenarios the network device 10 of FIG. 1 instead processes packets that each include more than two VPTs. In one embodiment and scenario, for example, the network device 10 processes a packet with three or more VPTs, and the extended priority profile mapping unit 22 maps some or all bits from the three or more VPTs to an extended priority profile.

Figure 3:
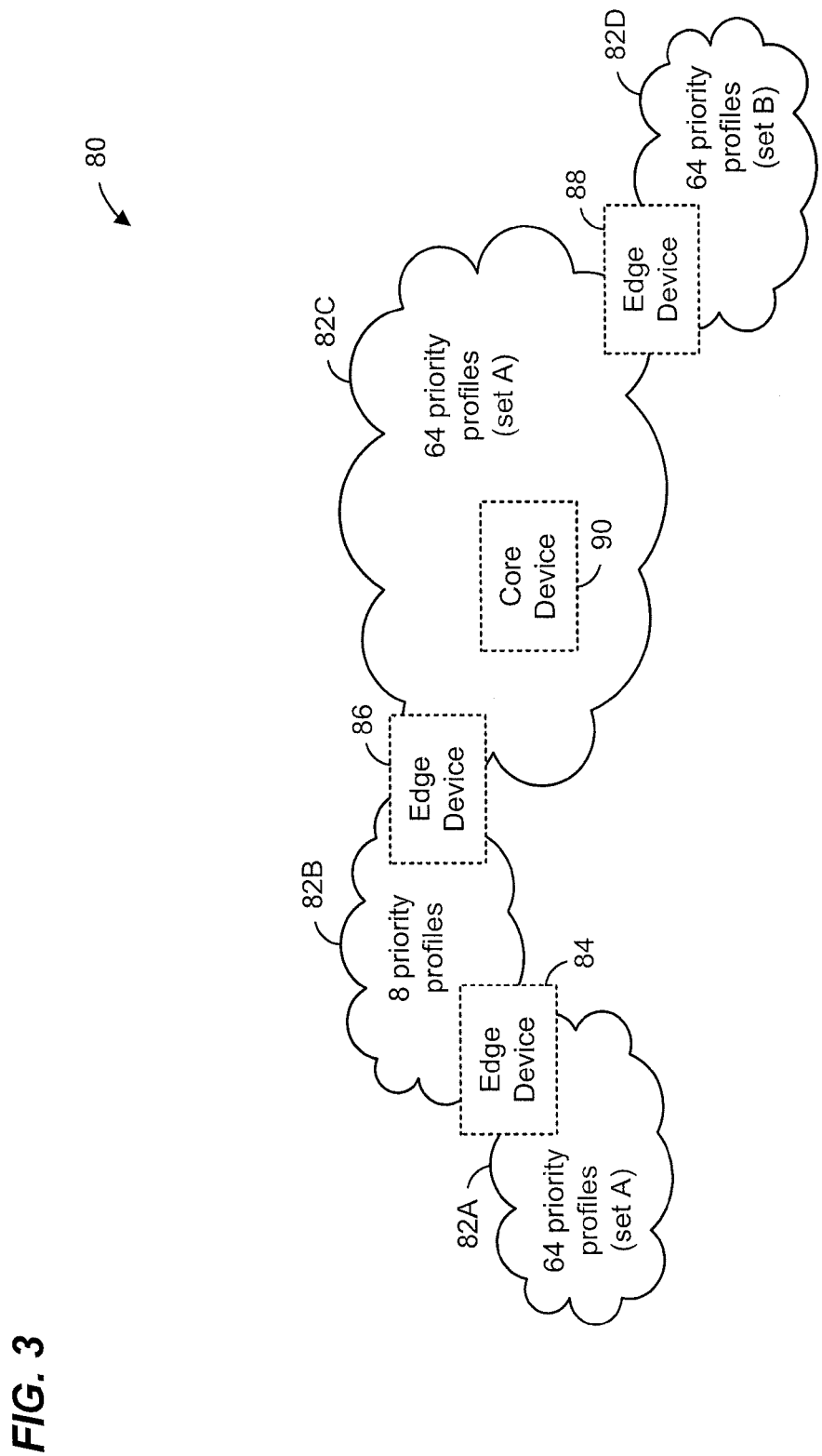
FIG. 3 is a block diagram of an example system that includes a plurality of coupled networks, including networks that implement the packet processing techniques of the present disclosure, according to an embodiment.

FIG. 3 is a block diagram of an example system 80 that includes a plurality of coupled networks 82A-82D, according to an embodiment. Each of the networks 82A-82D comprises a collection of network devices within a single Layer 2 DVPT domain (i.e., a collection of network devices sharing the same set of Layer 2 extended priority profiles). In an embodiment, networks 82A, 82C and 82D are non-legacy (extended priority) networks that each include network devices configured to support extended priority profiles, while network 82B is a legacy network that cannot support extended priority profiles. More specifically, in the example embodiment shown in FIG. 3, extended priority networks 82A, 82C and 82D each support 64 different priority profiles, while legacy network 82B supports only eight different priority profiles (e.g., the eight priority profiles provided by a three-bit, outer VLAN tag priority). This may correspond, for example, to an embodiment in which each of the two VPTs of a packet includes three bits, and the DVPT includes all six bits of the two VPTs.

In the example system 80, networks 82A and 82B are coupled via an edge device 84, networks 82B and 82C are coupled via an edge device 86, and networks 82C and 82D are coupled via an edge device 88. The edge devices 84, 86, 88 are network devices similar to network device 10 of FIG. 1, in an embodiment. In addition, each of the networks 82A-82D includes one or more core/backbone devices that do not provide an interface between the different networks, in some embodiments. For clarity, only a single device of this sort, core device 90 in extended priority network 82C, is shown in FIG. 3. Core device 90, and/or other core devices not seen in FIG. 3, are also network devices similar to network device 10 of FIG. 1, in an embodiment.

In some embodiments, at least two of the extended priority networks 82A, 82C and 82D define different sets of Layer 2 extended priority profiles, and therefore are associated with different Layer 2 DVPT domains (e.g., in a manner analogous to different DSCP domains for Layer 3).

In the example system 80 of FIG. 3, networks 82A and 82C are both a part of a first Layer 2 DVPT domain within which a first set of 64 extended priority profiles ("Set A") is used, while network 82D is a part of a second Layer 2 DVPT domain within which a different, second set of 64 extended priority profiles ("Set B") is used.

While the example system 80 is shown in FIG. 3 as including three extended priority networks and one legacy network, other embodiments include a different number of extended priority networks similar to networks 82A, 82C and 82D, and/or a different number of legacy networks similar to network 82B. Further, the extended priority networks 82A, 82C and/or 82D support more or fewer than 64 priority profiles, and/or the legacy network 82B supports more or fewer than eight priority profiles, in other embodiments. The operation of different devices within the network 80 will be described in more detail below with reference to FIG. 4.

Figure 4:
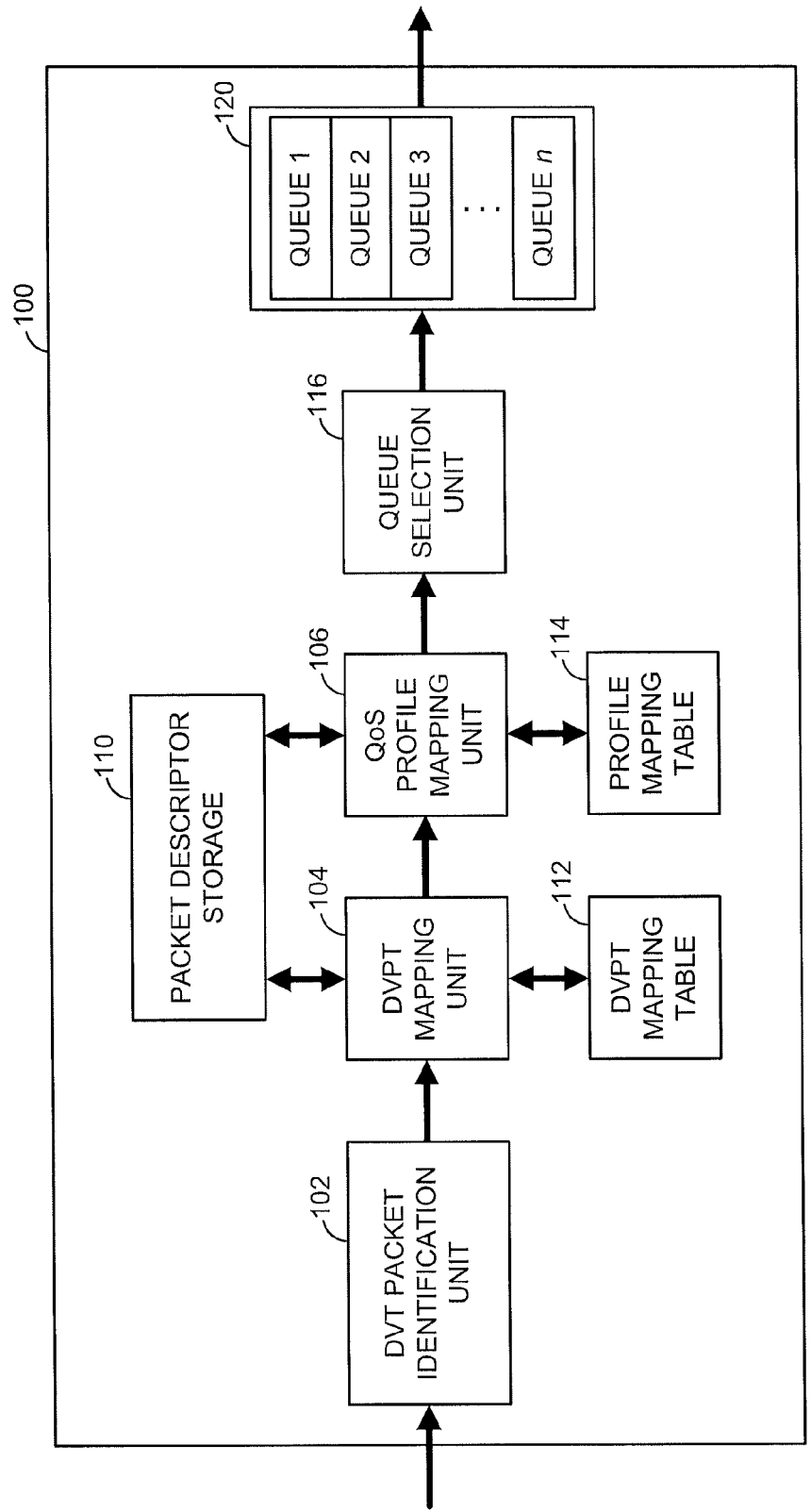
FIG. 4 is a block diagram providing a more detailed view of an example packet processor that implements packet processing techniques of the present disclosure, according to an embodiment.

FIG. 4 is a block diagram providing a more detailed view of an example packet processor 100 that implements packet processing techniques of the present disclosure, according to an embodiment. In one embodiment, the packet processor 100 is utilized as the packet processor 14 of network device 10 in FIG. 1. In other embodiments, however, the packet processor 100 is utilized in a network device different than network device 10. The various units within the packet processor 100 are first described based on their functionality, and then several example scenarios are described to illustrate the operation of the units. For ease of explanation, the functionality and operation of the packet processor 100 is described with reference to an embodiment and scenario in which the packet processor 100 operates on the example double VLAN tagged packet 40 shown in FIG. 2, and in which the DVPT that indicates an extended priority profile includes all six bits of the two VPTs (i.e., all bits of PCP field 64 and PCP field 74). In various other embodiments and/or scenarios, however, the packet processor 100 operates on other types of double VLAN tagged packets, such as TRILL packets, SPB packets, or packets having more than two VLAN tags, and/or the DVPT includes less than all bits of the individual VPTs.

The packet processor 100 includes a DVT packet identification unit 102, which identifies the received packet 40 as a double VLAN tagged packet. In some embodiments, the DVT packet identification unit 102 is a unit similar to DVT packet identification unit 20 of network device 10 in FIG. 1. In the example embodiment of FIG. 4, the DVT packet identification unit 102 is coupled to a DVPT mapping unit 104. In an embodiment, the DVPT mapping unit 104 is configured to read the DVPT of packet 40 (i.e., the value of all bits in PCP field 64 and PCP field 74), and to map that value to a new DVPT value. In an embodiment, the DVPT mapping unit 104 reads the DVPT of packet 40 by accessing a packet descriptor storage 110. In other embodiments, the DVPT mapping unit instead accesses a stored copy of the packet 40, or a stored copy of the header of the packet 40. The packet descriptor storage 110 (or header storage, etc.) is included in the memory 26 of network device 10 of FIG. 1, in an embodiment. In an embodiment, the DVPT mapping unit 104 maps an old DVPT value to a new DVPT value by using the old DVPT value as a key to a DVPT mapping table 112 stored in a memory, such as a content-addressable memory, for example. In another embodiment, the DVPT mapping unit 104 maps an old DVPT to a new DVPT by applying a configurable bit mask to the old DVPT, as described further below with reference to FIG. 7.

In some embodiments, the bits in the outer VPT of packet 40 (i.e., in PCP field 64) correspond to the most significant bits of the DVPT, and the bits in the inner VPT of packet 40 (i.e., in PCP field 74) correspond to the least significant bits of the DVPT. In other embodiments, the bits in the inner VPT of packet 40 (i.e., in PCP field 74) correspond to the most significant bits of the DVPT, and the bits in the outer VPT of packet 40 (i.e., in PCP field 64) correspond to the least significant bits of the DVPT. In some embodiments, which VPT corresponds to the most significant bits of the DVPT and which VPT corresponds to the least significant bits of the DVPT is a configurable parameter of the network device that includes packet processor 100.

In some embodiments, the DVPT mapping unit 104 only remaps the DVPT bit values when one or more criteria are met. In one embodiment, for example, the DVPT mapping unit 104 remaps the DVPT bit values only when the packet processor 100 determines that a "DVPT mode" is enabled, and/or only when the packet processor 100 determines that "DVPT-to-DVPT remapping" is enabled. In one embodiment, the "DVPT mode" is used to control whether the packet processor 100 treats the packet 40 according to an extended priority indicated by the DVPT, or according to a single VPT priority (e.g., according to PCP field 64 of the outer VLAN tag 50). "DVPT-to-DVPT remapping" is enabled or disabled, in an embodiment, based on how the packet processor 100 has been selectively configured. In one embodiment, for example, DVPT-to-DVPT remapping is disabled if the packet processor 100 is to be used within a core network device, but is enabled if the packet processor 100 is to be used within an edge device that forwards packets from a first Layer 2 DVPT domain (supporting a first set of extended priority profiles) to a second Layer 2 DVPT domain (supporting a different, second set of extended priority profiles). In an embodiment, the DVPT-to-DVPT remapping mechanism is similar to the DSCP-to-DSCP remapping mechanism used between Layer 3 DSCP domains.

The DVPT mapping unit 104 is coupled to a QoS profile mapping unit 106. The QoS profile mapping unit 106 is configured to read the bit values of the DVPT of the packet 40 from the packet descriptor storage 110 (whether or not those bits have been remapped by the DVPT mapping unit 104), and to map those bit values to an extended priority profile. In an embodiment, the QoS profile mapping unit 106 maps the DVPT value to an extended priority profile by using the DVPT as a key to a profile mapping table 114 stored in a memory, such as a content-addressable memory, for example. In some embodiments, each profile in the profile mapping table 114 corresponds to particular criteria that should, or must, be followed for the packet 40. In one embodiment, for example, a particular priority profile indicates a maximum allowable latency for the packet 40, which in turn causes one or more subsequent units in the packet processor 100 to process the packet 40 in a particular way (e.g., by placing the packet 40 in a particular queue).

In one embodiment where the packet processor 100 processes the packet 40 of FIG. 2, the profile mapping table 114 provides a set of at least 64 different priority profiles, any one of which may be applied to the packet 40 based on the mapping performed by QoS profile mapping unit 106. In one embodiment, the profile mapping table 114 provides a set of 64 different priorities that are identical, or substantially identical, to the 64 Layer 3 QoS options provided by DSCP.

Figure 5:
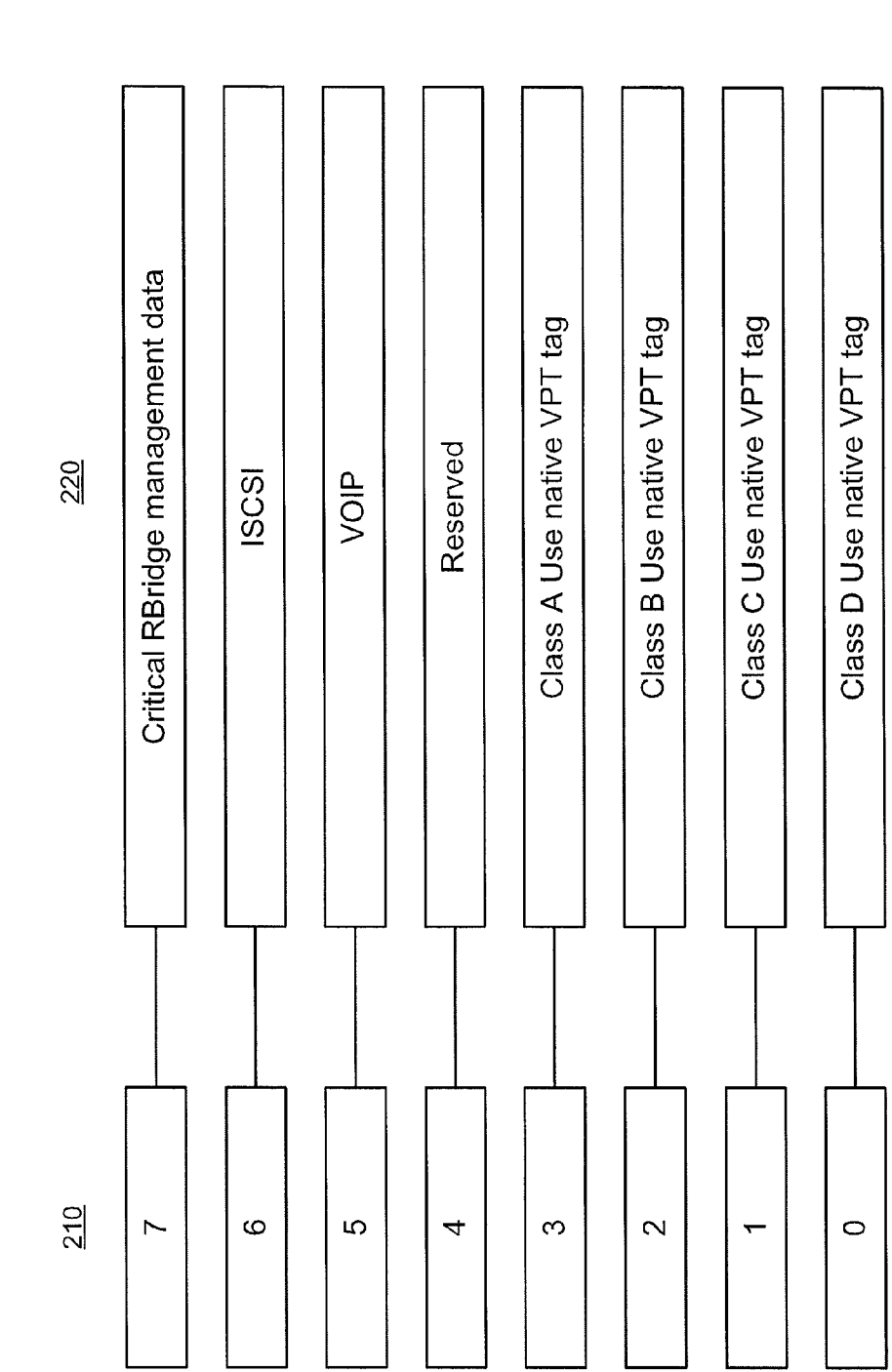
FIG. 5 is a diagram of an example profile mapping table arranged in a hierarchical manner, according to an embodiment.

In some embodiments, the priority profiles provided by the profile mapping table 114 are arranged in a hierarchical manner. In one embodiment, for example, the priority profiles are arranged such that the three most significant bits of the DVPT (e.g., the bits of an outer VPT, in one embodiment and/or configuration) specify a priority level, while the three least significant bits of the DVPT (e.g., the bits of an inner VPT, in one embodiment and/or configuration) specify a priority sub-level. FIG. 5 is a diagram of one example profile mapping table 200 that is arranged in such a hierarchical manner, according to an embodiment. In the example embodiment of FIG. 5, the index number 210 represents the value of the three most significant bits of the DVPT, with each index number corresponding to a different one of the priority profiles 220.

In some embodiments where n bits are used to indicate the priority level, between zero and $2^n$ priority levels correspond to generic "classes" that may be assigned to packets based on their DVPT values, while some or all of the remaining priority levels (if any) correspond to special priority profiles to be assigned to specific types of data. In the embodiment of FIG. 5, for example, the top three priority levels are reserved for specific data types: critical RBridge management data (e.g., "topology change" messages that are utilized when a network path is broken), Internet Small Computer System Interface (ISCSI) data (providing access to storage), and Voice-over-IP (VoIP) data. In this embodiment, the next highest priority level is a "reserved" priority profile (e.g., an unused/undefined profile, or a profile that is configurable by a system designer, etc.), which is followed by four general classes (Class A through Class D) that correspond to different priority levels that can be selectively assigned to a particular packet.

In some hierarchical embodiments, some or all of the priority levels are associated with a number of priority sub-levels. In one embodiment, for example, the priority sub-level is indicated by the three least significant bits of the DVPT, thereby providing up to eight different sub-levels. In the example embodiment of FIG. 5, the three least significant bits of the DVPT correspond to an inner, or "native," VPT tag, which indicates a priority sub-level for Class A, B, C or D packets. In this example embodiment, priority sub-levels are not used for the priority levels that correspond to specific traffic types (i.e., critical RBridge management data, ISCSI data, and VoIP data). In other embodiments, however, some or all of the priority profiles for specific traffic types are associated with a set of priority sub-levels.

In other embodiments, and referring again to FIG. 4, the priority profiles provided by the profile mapping table 114 are not arranged in a hierarchical manner (e.g., all bits of a six-bit DVPT are treated as a flat, six-bit value, in an embodiment). This "flat DVPT" approach may make priority manipulations (e.g., DVPT-to-DVPT remapping) simpler, for example.

In an embodiment, the profile mapping table 114 is a QoS profile table used to set the traffic class, user priority, DSCP, and drop precedence. In one embodiment where the packet processor 100 supports a set of 64 Layer 2 extended priority profiles when processing packets similar to packet 40, for example, the profile mapping table 114 has 128 entries that are arranged as follows:

TABLE 1

| | |
|---|---|
| DSCP | 0-63 |
| DVPT | 64-127 |
| VPT | $64 + n * 8$, where $n = 0 \ldots 7$ |

As seen in Table 1, such a profile mapping table provides "shearing" between VPT and DVPT table entries, which is made possible because, in this embodiment, the outer VPT corresponds to the most significant three bits of the DVPT, causing the VPT values to locate precisely at the table entries 64+n*8 (i.e., entries 64, 72, 80, etc.).

After the QoS profile mapping unit 106 has mapped the DVPT of packet 40 to an extended priority profile, a queue selection unit 116 within packet processor 100 selects one of n queues, within a queuing unit 120, as a queue to which packet 40 will be delivered. In an embodiment, each of the n queues in queuing unit 120 is associated with a particular priority-related attribute, such as a latency associated with the queue, for example. In an embodiment, the queue selection unit 116 selects the queue to which packet 40 will be delivered based on the extended priority profile determined by QoS profile mapping unit 106. The queuing unit 120 is associated with a single egress port of the network device that includes packet processor 100, in one embodiment. In some embodiments, the network device that includes packet processor 100 includes a queue selection unit similar to queue selection unit 116, and a queuing unit similar to queuing unit 120, for each egress port.

In some embodiments, the queuing unit 120 includes fewer than one queue per extended priority profile (e.g., n=4 queues or n=8 queues, in embodiments with 64 extended priority profiles). In other embodiments, the queuing unit 120 includes one queue per extended priority profile in the profile mapping table 114 (e.g., n=64 queues, in an embodiment with 64 extended priority profiles). In this manner, QoS enforcement may be more finely controlled. In some embodiments, the queues of queuing unit 120 are additionally used to process packets according to Layer 3 DSCP priorities.

In some embodiments, the packet processor 100 includes other priority-based processing units in addition to, or instead of, queue selection unit 116 and queuing unit 120. In one embodiment, for example, the packet processor 100 includes an egress processing unit that forwards packet 40 to a device address that is determined based on the extended priority profile.

In an embodiment, some or all of the units in packet processor 100 are implemented in hardware, in a processor that executes firmware and/or software instructions, or a combination thereof. In some embodiments, the units of packet processor 100 are implemented in whole or in part in hardware and process the packet substantially at wire speed. For example, all of the units are implemented in a hardware pipeline architecture within an ASIC, in an embodiment. In other embodiments, a different type of integrated circuit is used such as a PLD, an FPGA, a PLA, a custom integrated circuit, etc. In some embodiments, the units of the example packet processor 100 are implemented on multiple different integrated circuits that are coupled together. In some embodiments, as noted above, still other architectures and/or platforms are utilized, such as portions of code executed in a pipeline of programmable processing units, or functional program modules of one or more software-driven packet and/or network processors, for example.

The operation of packet processing unit 100 is now described with reference to the system 80 of FIG. 3, in accordance with one embodiment, for several different example scenarios. In a first example scenario, the packet processor 100 is included in the edge device 84, receives packet 40 from a device in legacy network 82B, and forwards the packet 40 to a device in extended priority network 82A. In an embodiment, the DVT packet identification unit 102 first identifies packet 40 as a double VLAN tagged packet. Moreover, because the device 84 is configured as an edge device, the packet processor 100 knows a priori that packets received from network 82B and headed for network 82A will need to have both VPTs mapped to a DVPT. Thus, the DVPT mapping unit 104 maps the three bits of PCP field 64 and the three bits of PCP field 74 to a six-bit DVPT, and the QoS profile mapping unit 106 maps the six-bit DVPT to one of the 64 priority profiles in "Set A," in an embodiment. The queue selection unit 116 then selects one of queues in queuing unit 120 based on the resulting priority profile, and the packet 40 is entered in the selected queue, in an embodiment. Thereafter, other units within edge device 84, and/or any subsequent network devices to which packet 40 is forwarded within extended priority network 82A, can process packet 40 according to the extended priority profile determined by QoS profile mapping unit 106.

In a second example scenario, the packet processor 100 is again included in edge device 84, but receives packet 40 from a device in extended priority network 82A and forwards packet 40 to a device in legacy network 82B. Again, in this scenario, the DVT packet identification unit 102 first identifies packet 40 as a double VLAN tagged packet. Moreover, because the device 84 is configured as an edge device, the packet processor 100 knows a priori that packets received from network 82A and headed for network 82B will need to have their DVPT mapped to a single VPT (i.e., the VPT corresponding to the eight priority profiles of network 82B). Thus, the DVPT mapping unit 104 maps the DVPT of packet 40 to a three-bit VPT that is used to overwrite PCP field 64. In an embodiment, the QoS profile mapping unit 106 then maps the three-bit VPT to one of eight priority profiles, and the queue selection unit 116 selects one of queues in queuing unit 120 based on the resulting priority profile.

In this scenario, in some embodiments, the packet processor 100 seeks to preserve enough information to allow the DVPT of packet 40 (prior to conversion to the single VPT) to later be reconstructed by another device. In one embodiment, for example, the DVPT mapping unit 104 leaves the bits of PCP field 74 unchanged in packet 40, so that, for instance, edge device 86 can determine how to map the bits of PCP fields 64 and 74 back to the DVPT before forwarding the packet to a device in network 82C.

In a third example scenario, the packet processor 100 is included in edge device 88, receives packet 40 from a device in extended priority network 82C (in a first Layer 2 DVPT domain), and forwards packet 40 to a device in extended priority network 82D (in a second, different Layer 2 DVPT domain). Again, in this scenario, the DVT packet identification unit 102 first identifies packet 40 as a double VLAN tagged packet. Moreover, because the device 88 is configured as an edge device, the packet processor 100 knows a priori that packets received from network 82C and headed for network 82D will need to have a DVPT mapped from the original value to a new value. Thus, the DVPT mapping unit 104 maps the DVPT of packet 40 to a new DVPT that is used to overwrite PCP fields 64 and 74. In an embodiment, the QoS profile mapping unit 106 then maps the new DVPT to one of the 64 priority profiles in "Set B," and the queue selection unit 116 selects one of queues in queuing unit 120 based on the resulting priority profile. Thereafter, other units within edge device 88, and/or any subsequent network devices to which packet 40 is forwarded within extended priority network 82D, can process packet 40 according to the extended priority profile determined by QoS profile mapping unit 106.

In an embodiment, the core device 90 of system 80 in FIG. 3 is configured to process packets such as packet 40 according to the extended priority profile set by an edge device, but does not perform mapping of Layer 2 priorities. In one such embodiment, for example, core device 90 includes DVT packet identification unit 102, queue selection unit 116, and/or queuing unit 120, but does not include (or does not utilize) DVPT mapping unit 104 or QoS profile mapping unit 106.

As noted above, QoS profiles are arranged in a hierarchical manner in some embodiments. In some of these embodiments, the QoS profiles are arranged according to a special hierarchy that allows a simpler mapping between legacy and extended priority profiles. In one such embodiment, a first VLAN tag (e.g., an outer VLAN tag) provides priority levels that correspond to the priority profiles supported by legacy devices/networks, while a second VLAN tag (e.g., an inner VLAN tag) provides priority sub-levels for each of one or more of the first VLAN tag priority levels. Thus, in this embodiment, a legacy switch can process a packet by examining the priority of only a single VLAN tag (e.g., the outer VLAN tag priority), while a non-legacy switch can provide a finer priority resolution for the same packet by examining the full DVPT (i.e., both the outer VLAN tag priority and the inner VLAN tag priority).

Figure 6:
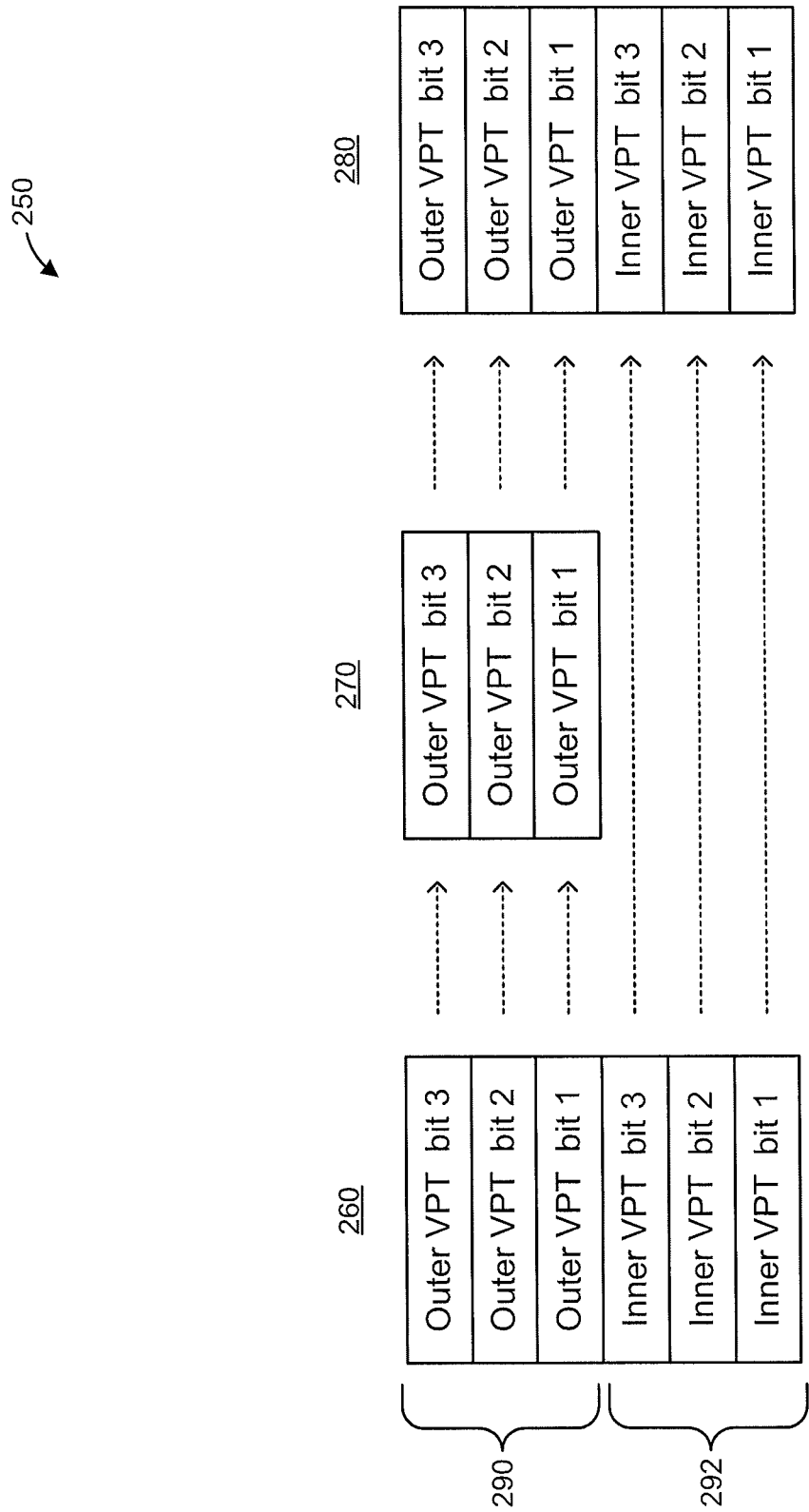
FIG. 6 is a diagram of an example transition, in a hierarchical priority scheme, in the set of bits utilized to determine priority of a packet as the packet travels between non-legacy and legacy networks, according to an embodiment.

One such embodiment is shown in FIG. 6, which illustrates an example transition 250, in a hierarchical priority scheme, in the set of bits utilized to determine priority of a packet as the packet travels from a non-legacy network to a legacy network, and then back to a non-legacy network. In particular, the bit set 260 represents the DVPT bits utilized to indicate a priority profile in a device in a first, non-legacy network (e.g., in network 82A of FIG. 3), the bit set 270 represents the single VPT bits utilized to indicate a priority profile in a device in a second, legacy network (e.g., in network 82B of FIG. 3), and the bit set 280 represents the DVPT bits utilized to indicate a priority profile in a device in a third, non-legacy network that is associated with the same Layer 2 domain as the first network (e.g., in network 82C of FIG. 3). In the example transition 250, coarse priority levels are indicated by the three bits 290 of an outer VLAN tag of a packet, and priority sub-levels are indicated by the three bits 292 of an inner VLAN tag of the same packet. Moreover, in the example transition 250, the legacy network utilizes priority profiles that exactly correspond to the priorities indicated by the three bits 290 of the outer VLAN tag. Thus, in this embodiment, as a packet travels from the first (non-legacy) network to the second (legacy) network, and then to the third (non-legacy) network, no remapping of outer VLAN tag priority bits 290 is required. In some embodiments, devices in the intermediate legacy network "save" the values of bits 292 by preserving the original values in the inner VLAN tag as the packet travels through the legacy network, thereby allowing the bit set 280 (i.e., the DVPT) to be fully reconstructed at an edge device (e.g., edge device 86 of FIG. 3) when the packet reenters a non-legacy network.

Figure 7:
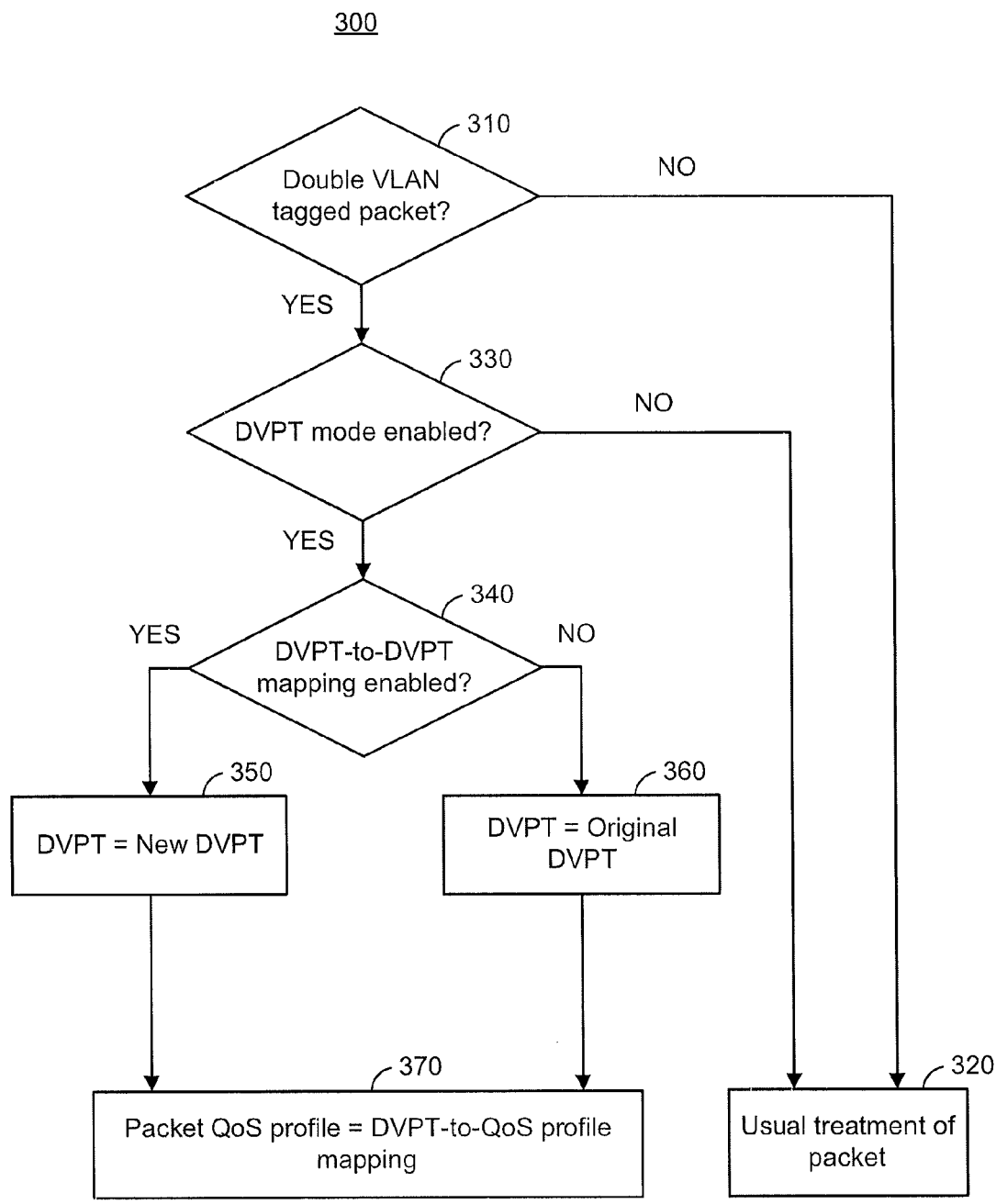
FIG. 7 is a flow diagram of an example method for determining an extended Quality of Service (QoS) profile, according to an embodiment.

FIG. 7 is a flow diagram of an example method 300 for determining an extended QoS profile, according to one embodiment. In various embodiments, the method 300 is implemented by the DVT packet identification unit 102, DVPT mapping unit 104, and QoS profile mapping unit 106 of FIG. 4, or by the DVT packet identification unit 20 and extended priority profile mapping unit 22 of FIG. 1.

At block 310, it is determined whether a received packet is a double VLAN tagged packet. If it is determined at block 310 that the packet is not a double VLAN tagged packet, flow proceeds to block 320, where the packet is treated in the usual manner (e.g., is processed according to the single VLAN tag priority). If it is determined at block 310 that the packet is a double VLAN tagged packet, flow proceeds instead to block 330.

At block 330, it is determined whether a DVPT mode is enabled for the network device in which the method 300 is implemented. In an embodiment, the DVPT mode of the network device controls whether the network device treats received packets according to an extended priority indicated by a DVPT, or according to a single VLAN tag priority. If disabled, flow proceeds to block 320, where the packet is processed according to a single VLAN tag priority (e.g., the outer VLAN tag priority). If enabled, flow proceeds instead to block 340.

At block 340, it is determined whether DVPT-to-DVPT mapping is enabled for the network device in which the method 300 is implemented. If disabled, the original DVPT of the packet is maintained (block 360). If enabled, the original DVPT is mapped to a new DVPT (block 350). Finally, at block 370, the new or original DVPT is mapped to an extended priority profile corresponding to the QoS level for the packet.

Figure 8:
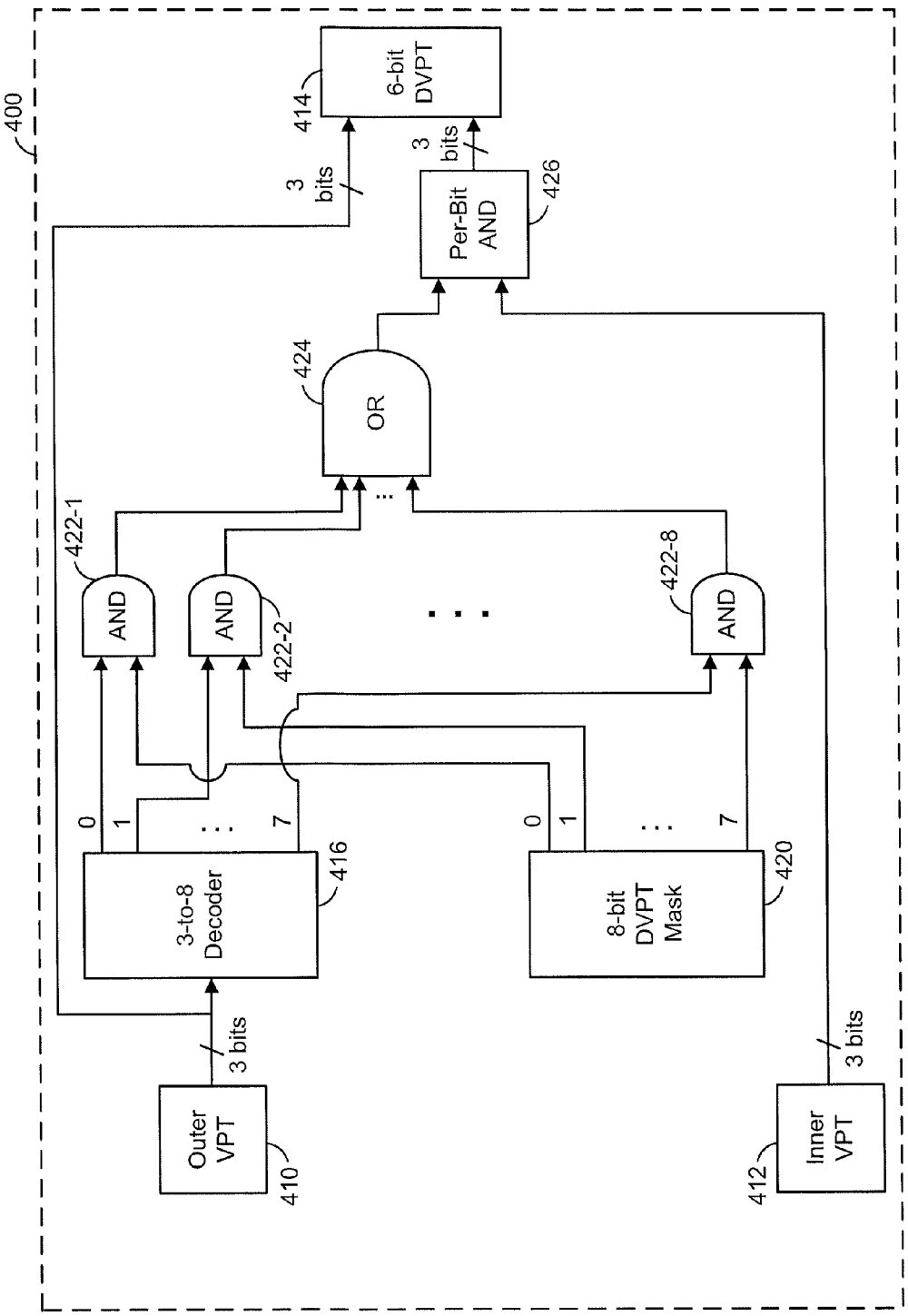
FIG. 8 is a block diagram providing a more detailed view of an example double VLAN priority tag mapping unit, according to an embodiment.

FIG. 8 is a block diagram providing a more detailed view of an example DVPT mapping unit 400, according to an embodiment. In one embodiment, the DVPT mapping unit 400 is utilized as the DVPT mapping unit 104 of packet processor 100 in FIG. 4. In other embodiments, however, the DVPT mapping unit 104 is utilized in a packet processor different than packet processor 100.

The example DVPT mapping unit 400 accepts as inputs a three-bit outer VPT 410 and a three-bit inner VPT 412, and outputs a six-bit DVPT 414 to which the VPTs 410 and 412 are mapped. In one embodiment, for example, the outer VPT 410 is the PCP field 64 in outer VLAN tag 50 of packet 40, and the inner VPT 412 is the PCP field 74 in inner VLAN tag 52 of packet 40. In one embodiment, the DVPT mapping unit 400 reads the outer VPT 410 and inner VPT 412 from a memory such as packet descriptor storage 110 in FIG. 4.

The DVPT mapping unit 400 includes a 3-to-8 decoder 416 that outputs a "one" on one of eight lines (and "zeros" on the other seven lines) to reflect the value of outer VPT 410. In one embodiment, for example, the 3-to-8 decoder 416 outputs a "one" only on line number 1 when the outer VPT bit values are 001, and outputs a "one" only on line number 7 when the outer bit values are 111. The DVPT mapping unit 400 controls how the mapping is performed by way of an eight-bit DVPT mask 420. In an embodiment, the value of the DVPT mask 420 can be selectively configured, e.g., automatically or by a system designer.

The eight outputs of the 3-to-8 decoder 416 and the eight outputs of DVPT mask 420 are input to a set of AND gates 422-1 through 422-8. In particular, in an embodiment, each of AND gates 422-1 through 422-8 performs a logical AND operation on one bit from the 3-to-8 decoder 416 and the corresponding bit from the DVPT mask 420, as seen in FIG. 8. An OR gate 424 performs a logical OR operation on the outputs of all of AND gates 422-1 through 422-8, and provides the result/output to per-bit AND logic 426. The inner VPT 412 is also input to the per-bit AND logic 426. The per-bit AND logic 426 outputs the inner VPT 412 bits to the six-bit DVPT 414 if, and only if, the output of OR gate 424 is "one," in an embodiment.

In an embodiment, the value of DVPT mask 420 and the value of the outer VPT 410 collectively determine whether the inner VPT bits 412 are mapped to a portion of the DVPT 414. If both the outer VPT 410 and inner VPT 412 are to be mapped to the DVPT 414 only for one or more particular priorities, for example, then only the corresponding bit(s) of DVPT mask 420 should be set to "one," in an embodiment. Thus, in one example embodiment and scenario where the inner VPT 412 should be mapped to the DVPT 414 only if the outer VPT 410 is equal to 001 or 111 (i.e., only if the 3-to-8 decoder 416 outputs the eight bits 0000 0010 or 1000 0000, respectively), then the eight bits of DVPT mask 420 are set to 1000 0010. As a result, when this mask value is set and a packet arrives with outer VPT 410 equal to 001 or 111, the AND gate 422-2 or 422-8 outputs a "one," which causes the OR gate 424 to output a "one." This in turn causes the per-bit AND logic 426 to pass the inner VPT 412 to the DVPT 414. Conversely, for packets where the outer VPT 410 is not equal to 001 or 111, the inner VPT 412 is blocked from the DVPT 414, and the corresponding three bits of the DVPT 414 are set in some other manner. In one embodiment, for example, the three bits of the DVPT 414 are set based on a port configuration.

In an embodiment, the outer VPT 410 bits serve as the three most significant bits of the six-bit DVPT 414, and the three bits output by the per-bit AND logic 426 serve as the least significant three bits of the six-bit DVPT 414. In another embodiment, the outer VPT 410 bits serve as the three least significant bits of the six-bit DVPT 414, and the three bits output by the per-bit AND logic 426 serve as the most significant three bits of the six-bit DVPT 414. In some embodiments, a system designer may selectively configure the outer VPT 410 bits to serve as the most significant bits of the DVPT 414, as the least significant bits of the DVPT 414, or as some other arrangement of bits within in the DVPT 414.

Figure 9:
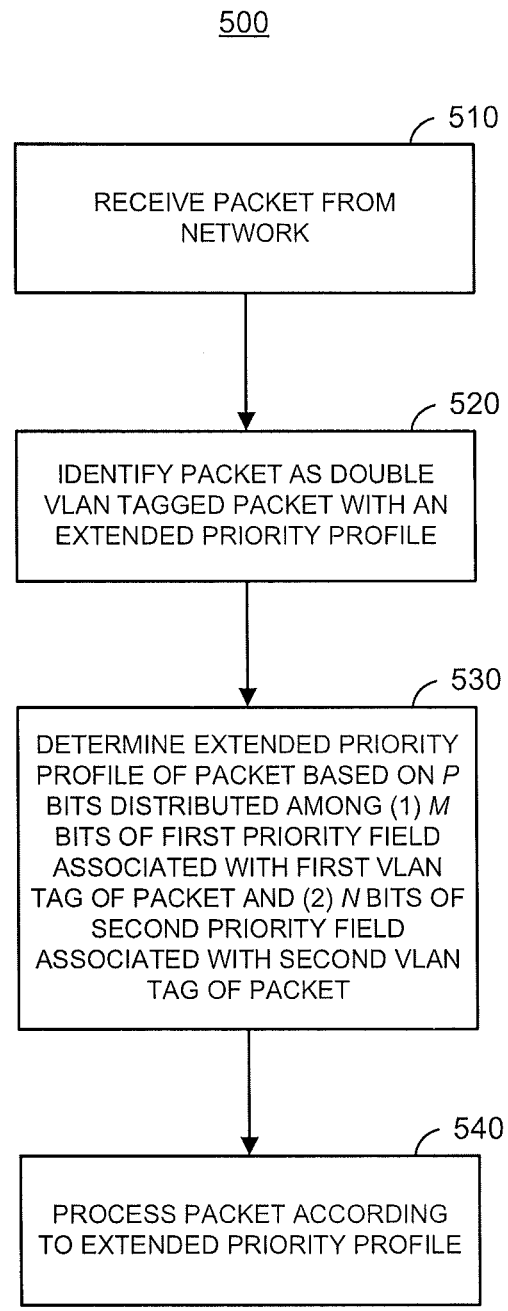
FIG. 9 is a flow diagram of an example method for processing a packet in a network device configured to support extended priority profiles, according to an embodiment.

FIG. 9 is a flow diagram of an example method 500 for processing a packet in a network device configured to support extended priority profiles, according to an embodiment. In various embodiments, the method 500 is implemented by the network device 10 of FIG. 1, or by a network device that includes the packet processor 100 of FIG. 4. In one embodiment, the method 500 is implemented by a network device situated similarly to core device 90 in FIG. 3, in a scenario where the network device is receiving a packet from another device within the same network 82C. In some embodiments, the entire method 500 is implemented separately within each of a plurality of network devices within a network corresponding to a particular Layer 2 domain.

At block 510, a packet is received from a network (e.g., a network similar to network 82C). In an embodiment, the packet is received at, or via, a packet ingress similar to packet ingress 12 of network device 10 in FIG. 1.

At block 520, the packet received at block 510 is identified as a double VLAN tagged packet (i.e., a packet with at least two VLAN tags) with an extended priority profile. In one embodiment where the packet received at block 510 is an Ethernet packet, for example, the packet is identified as one of a TRILL packet, an SPB packet, or an IEEE 802.1ad packet. In some embodiments, the packet is identified as a double VLAN tagged packet with an extended priority profile by determining that the packet was received via a port known to correspond to double VLAN tagged packets having extended priority profiles.

At block 530, the extended priority profile of the packet received at block 510 is determined based on P bits that are distributed among M bits of a first priority field associated with a first VLAN tag of the packet and N bits of a second priority field associated with a second VLAN tag of the packet. The extended priority profile of the packet is determined from among a group of possible extended priority profiles that is larger than the group of possible priority profiles associated with the first priority field and larger than the group of possible priority profiles associated with the second priority field. In some embodiments, the P bits on which the extended priority profile determination is based include all M bits of the first priority field and all N bits of the second priority field. In one such embodiment, the extended priority profile is determined from among a group of $2^{(M+N)}$ possible extended priority profiles. In some embodiments, the P bits are further distributed among bits in at least a third priority field.

In one embodiment where the packet is identified at block 520 as a TRILL packet associated with an extended priority profile, the P bits on which the extended priority profile determination is based are distributed among M bits of a first priority field associated with a first VLAN tag within a link header of the TRILL packet, and N bits of a second priority field associated with a second VLAN tag within a TRILL header of the TRILL packet. In one embodiment where the packet is identified at block 520 as an IEEE 802.1ad packet associated with an extended priority profile, the P bits on which the extended priority profile determination is based are distributed among M bits of a first priority field associated with a customer VLAN tag of the packet, and N bits of a service VLAN tag of the packet.

In some embodiments where a hierarchical profile arrangement is utilized, the extended priority profile determined at block 530 is a profile that corresponds to both a priority level and a priority sub-level within that priority level. In one such embodiment, the priority level is indicated by a first set of one or more bits distributed among the M bits of the first priority field and/or the N bits of the second priority field, and the priority sub-level is indicated by a second set of one or more bits distributed among the M bits of the first priority field and/or the N bits of the second priority field. FIG. 6, discussed above, provides one example of such an embodiment, for the specific case in which M=N=3, the priority level is indicated by all three priority bits of the outer VLAN tag, and the priority sub-level is indicated by all three priority bits of the inner VLAN tag.

At block 540, the packet is processed according to the extended priority profile determined at block 500. In one embodiment, for example, the packet is assigned to a particular queue based on the extended priority profile.

Figure 10:
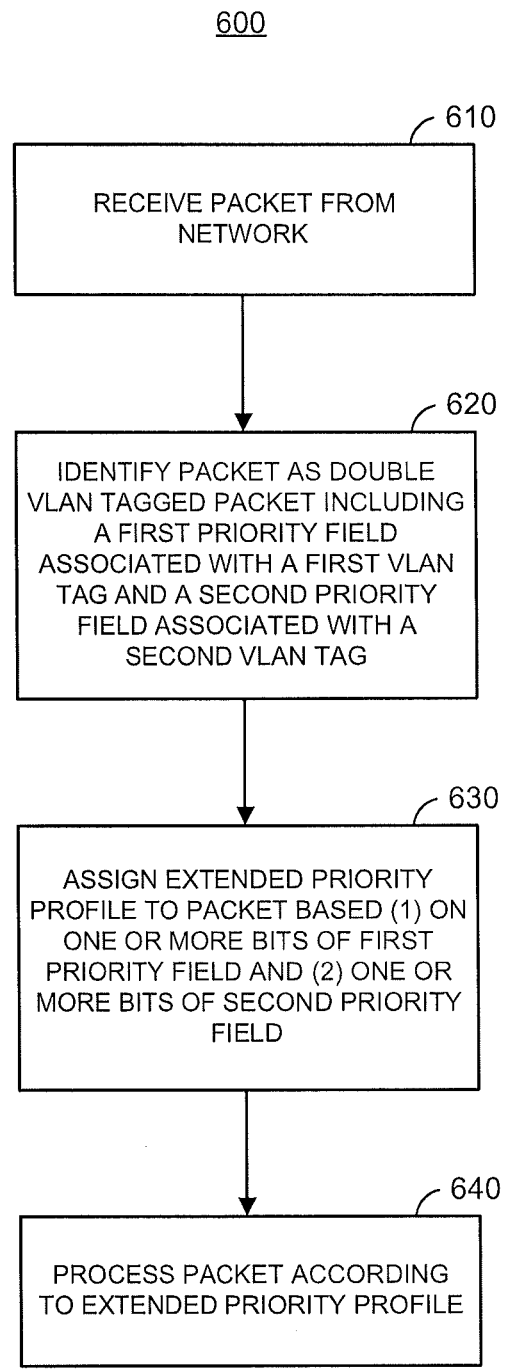
FIG. 10 is a flow diagram of an example method for processing a packet in a network device configured to support extended priority profiles, according to one embodiment and scenario in which the network device applies a new extended priority profile to the packet.

FIG. 10 is a flow diagram of an example method 600 for processing a packet in a network device configured to support extended priority profiles, according to one embodiment and scenario in which the network device applies a new extended priority profile to the packet. In various embodiments, the method 600 is implemented by the network device 10 of FIG. 1, or by a network device that includes the packet processor 100 of FIG. 4. In one embodiment, the method 600 is implemented by a network device situated similarly to edge device 84 in FIG. 3, in a scenario where the network device is receiving a packet from the legacy network 82B.

At block 610, a packet is received from a network (e.g., a network similar to network 82B). In an embodiment, the packet is received at, or via, a packet ingress similar to packet ingress 12 of network device 10 in FIG. 1.

At block 620, the packet received at block 610 is identified as a double VLAN tagged packet that includes a first priority field associated with a first VLAN tag and a second priority field associated with a second VLAN tag. In one embodiment where the packet received at block 610 is an Ethernet packet, for example, the packet is identified as one of a TRILL packet, an SPB packet, or an IEEE 802.1ad packet. In some embodiments, the packet is identified as a double VLAN tagged packet by determining that the packet was received via a port known to correspond to double VLAN tagged packets.

At block 630, an extended priority profile is assigned to the packet received at block 610 based on one or more bits of the first priority field and one or more bits of the second priority field. The extended priority profile that is assigned at block 630 is one among a group of possible extended priority profiles, and the group of possible extended priority profiles is larger than any group of possible priority profiles associated with a single VLAN tag of the packet. Thus, for example, the group of possible extended priority profiles is larger than the group of possible priority profiles associated with the first priority field of the packet, and is larger than the group of possible priority profiles associated with the second priority field of the packet. In one embodiment, the group of possible extended priority profiles is larger than the combination of both the group of possible priority profiles associated with the first priority field and the group of possible priority profiles associated with the second priority field.

More specifically, in one embodiment, the group of possible priority profiles associated with the first priority field consists of $2^M$ priority profiles (M being an integer greater than zero), the group of possible priority profiles associated with the second priority field consists of $2^N$ priority profiles (N being an integer greater than zero), and the group of possible extended priority profiles consists of $2^{(M+N)}$ priority profiles. In one embodiment, the group of possible priority profiles associated with the first priority field and the group of possible priority profiles associated with the second priority field each include only eight profiles (i.e., M=N=3), while the group of possible extended priority profiles includes $2^{(3+3)}=64$ different profiles.

In some embodiments, assigning the extended priority profile to the packet at block 630 includes mapping the one or more bits of the first priority field of the packet and the one or more bits of the second priority field of the packet to the extended priority profile. Moreover, in some of these embodiments, mapping these various bits to the extended priority profile includes at least a two stage process of mapping the one or more bits of the first priority field and the one or more bits of the second priority field to extended priority bits (e.g., to a DVPT), and then mapping those extended priority bits to the extended priority profile. Also, in some of these embodiments, mapping the various bits to the extended priority profile includes overwriting at least a portion of the first priority field of the packet and at least a portion of the second priority field of the packet with new bit values representing the extended priority profile.

In some embodiments where a hierarchical profile arrangement is utilized, the extended priority profile assigned at block 630 is a profile that corresponds to both a priority level and a priority sub-level within that priority level. In one such embodiment, the priority level is indicated by a first set of one or more bits distributed among the one or more bits of the first priority field and/or the one or more bits of the second priority field, and the priority sub-level is indicated by a second set of one or more bits distributed among the one or more bits of the first priority field and/or the one or more bits of the second priority field.

At block 640, the packet is processed according to the extended priority profile assigned at block 630. In one embodiment, the processing at block 640 includes selecting one of a plurality of queues based on the extended priority profile assigned at block 630, and sending the packet, a portion of the packet, or a packet descriptor associated with the packet to the selected queue. In one such embodiment, each queue of the plurality of queues corresponds to a different one of the possible extended priority profiles.

In some embodiments, the method 600 includes additional blocks not seen in FIG. 10. In one embodiment, for example, the method 600 includes additional blocks in which the packet is processed according to the extended priority profile assigned at block 630. As another example, in one embodiment where the packet is received from a legacy network that is not configured to support the extended priority profile assigned at block 630 (e.g., network 82B), the method 600 includes an additional block in which the packet is transmitted via a packet egress to a non-legacy network that is configured to support the extended priority profile assigned at block 630 (e.g., a network similar to network 82A).

Figure 11:
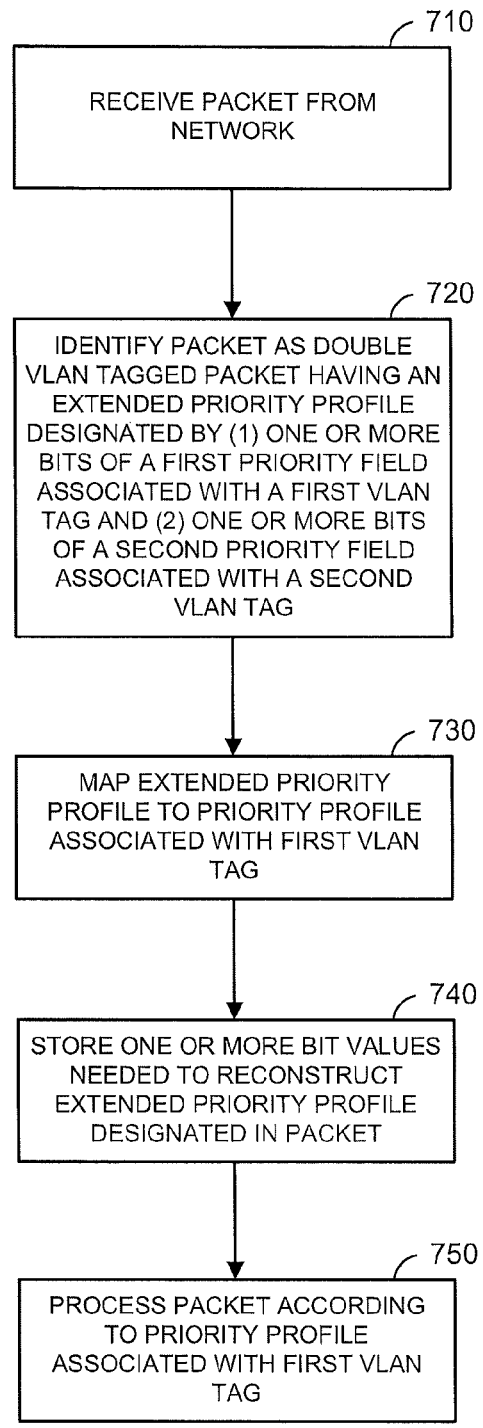
FIG. 11 is a flow diagram of an example method for processing a packet in a network device configured to support extended priority profiles, according to one embodiment and scenario in which the network device converts an extended priority profile of the packet to a priority profile associated with a single VLAN tag of the packet.

FIG. 11 is a flow diagram of an example method 700 for processing a packet in a network device configured to support extended priority profiles, according to one embodiment and scenario in which the network device converts an extended priority profile of the packet to a priority profile associated with a single VLAN tag of the packet. In various embodiments, the method 700 is implemented by the network device 10 of FIG. 1, or by a network device that includes the packet processor 100 of FIG. 4. In one embodiment, the method 700 is implemented by a network device situated similarly to edge device 84 in FIG. 3, in a scenario where the network device is receiving a packet from the extended priority profile network 82A.

At block 710, a packet is received from a network (e.g., a network similar to network 82A). In an embodiment, the packet is received at, or via, a packet ingress similar to packet ingress 12 of network device 10 in FIG. 1.

At block 720, the packet received at block 710 is identified as a double VLAN tagged packet having an extended priority profile designated by one or more bits of a first priority field associated with a first VLAN tag of the packet and by one or more bits of a second priority field associated with a second VLAN tag of the packet. In one embodiment, the packet is identified as a double VLAN tagged packet having an extended priority profile that is designated by all bits of the first priority field and all bits of the second priority field.

At block 730, the extended priority profile of the packet is mapped to a priority profile associated with the first VLAN tag. In some embodiments, the mapping at block 730 is performed at least in part by mapping a DVPT indicative of the extended priority profile to a single VPT indicative of the priority profile associated with the first VLAN tag.

At block 740, one or more bit values needed to reconstruct the extended priority profile (designated in the packet received at block 710) are stored in a memory. In one embodiment, for example, the bit values that allow the extended priority profile to be reconstructed (e.g., later in the same network device implementing the method 700, or in a different, edge device within the same network) are stored by overwriting VPT field values in a packet, packet header, or packet descriptor.

At block 750, the packet is processed according to the priority profile associated with the first VLAN tag. In one embodiment, the processing at block 750 includes selecting one of a plurality of queues based on the priority profile associated with the first VLAN tag, and sending the packet, a portion of the packet, or a packet descriptor associated with the packet to the selected queue.

In some embodiments, the method 700 includes additional blocks not seen in FIG. 11. In one embodiment, for example, the method 700 includes an additional block, after block 750, in which the packet is caused to be forwarded to another network device with certain bits of the packet set to particular values. In one embodiment, for example, bits of the first priority field are set to bit values that correspond to the priority profile associated with the first VLAN tag, and bits of the second priority field are set to the one or more bit values needed to reconstruct the extended priority profile. In another example embodiment, the method 700 includes an additional block, after block 750, in which the extended priority profile of the packet is reconstructed using bit values corresponding to the priority profile associated with the first VLAN tag, and using the one or more bit values that are needed to reconstruct the extended priority profile designated in the packet.

Embodiments of the present disclosure may be embodied in any type of network device used in a wired or wireless communication system including, for example, devices used in communication systems including or coupled to a wired or wireless LAN or a wired or wireless WAN, Internet, cable, etc.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A network device comprising:
a packet ingress configured to receive packets from a network; and
a packet processor configured to
identify a first packet of the received packets as a double virtual local area network (VLAN) tagged packet including (i) a first priority field associated with a first VLAN tag and (ii) a second priority field associated with a second VLAN tag,
in response to identifying the first packet as a double VLAN tagged packet, assign an extended priority profile to the first packet based on (i) one or more bits of the first priority field associated with the first VLAN tag of the first packet and (ii) one or more bits of the second priority field associated with the second VLAN tag of the first packet, the extended priority profile being among a group of possible extended priority profiles, the group of possible extended priority profiles corresponding to a first group of different priorities of service of packets that is larger than any second group of different priorities of service of packets, the second group of different priorities of service being associated with a single one of the first priority field or the second priority field of the first packet, and
process the first packet according to the assigned extended priority profile.

2. A network device according to claim 1, further comprising a plurality of queues, and wherein the packet processor is configured to process the first packet according to the assigned extended priority profile at least in part by:
selecting one of the plurality of queues based on the assigned extended priority profile; and
sending the first packet, a portion of the first packet, or a packet descriptor associated with the first packet to the selected queue.

3. A network device according to claim 2, wherein each profile in the group of possible extended priority profiles corresponds to a different one of the plurality of queues.

4. A network device according to claim 1, wherein the group of possible extended priority profiles is larger than a combination of (i) a first group of possible priority profiles associated with the first priority field and (ii) a second group of possible priority profiles associated with the second priority field.

5. A network device according to claim 4, wherein:
the first group of possible priority profiles consists of $2^M$ priority profiles, where M is an integer greater than zero;
the second group of possible priority profiles consists of $2^N$ priority profiles, where N is an integer greater than zero; and
the group of possible extended priority profiles consists of $2^{(M+N)}$ priority profiles.

6. A network device according to claim 1, wherein the packet processor is configured to assign the extended priority profile to the first packet at least in part by:
mapping the one or more bits of the first priority field of the first packet and the one or more bits of the second priority field of the first packet to the extended priority profile.

7. A network device according to claim 6, wherein the packet processor is configured to map the one or more bits of the first priority field of the first packet and the one or more bits of the second priority field of the first packet to the extended priority profile at least in part by:
mapping the one or more bits of the first priority field of the first packet and the one or more bits of the second priority field of the first packet to extended priority bits; and
mapping the extended priority bits to the extended priority profile.

8. A network device according to claim 6, wherein the packet processor is configured to assign the extended priority profile to the first packet further by:
overwriting at least a portion of the first priority field of the first packet and at least a portion of the second priority field of the first packet with new bit values representing the extended priority profile.

9. A network device according to claim 1, wherein the assigned extended priority profile corresponds to:
a priority level indicated by a first set of one or more bits distributed among at least one of (i) the one or more bits of the first priority field of the first packet and (ii) the one or more bits of the second priority field of the first packet; and
a priority sub-level indicated by a second set of one or more bits distributed among at least one of (i) the one or more bits of the first priority field of the first packet and (ii) the one or more bits of the second priority field of the first packet.

10. A network device according to claim 1, wherein:
the packet ingress is configured to receive Ethernet packets from the network; and
the packet processor is configured to identify the first packet as a double VLAN tagged packet at least in part by identifying the first packet as one of (i) a Transparent Interconnection of Lots of Links (TRILL) packet, (ii) a Shortest Path Bridging (SPB) packet, or (iii) an IEEE 802.1ad packet.

11. A network device according to claim 1, wherein the packet processor is configured to identify the first packet as a double VLAN tagged packet at least in part by determining that the first packet was received via a port corresponding to double VLAN tagged packets.

12. A network device according to claim 1, further comprising a packet egress, wherein:
the packet ingress is configured to receive the packets from a legacy network that is not configured to support the extended priority profile; and
the packet processor is further configured to transmit the first packet, via the packet egress, to a non-legacy network that is configured to support the extended priority profile.

13. A network device according to claim 1, wherein at least a portion of the packet processor resides within the packet ingress.

14. A method in a network device coupled to a network, the method comprising:
receiving a packet from the network;
identifying the packet as a double VLAN tagged packet including (i) a first priority field associated with a first VLAN tag and (ii) a second priority field associated with a second VLAN tag;
in response to identifying the first packet as a double VLAN tagged packet, assigning an extended priority profile to the packet based on (i) one or more bits of the first priority field associated with the first VLAN tag of the packet and (ii) one or more bits of the second priority field associated with the second VLAN tag of the packet, the extended priority profile being among a group of possible extended priority profiles, the group of possible extended priority profiles corresponding to a first group of different priorities of service of packets that is larger than any second group of different priorities of service of packets, the second group of different priorities of service being associated with a single one of the first priority field or the second priority field of the packet; and
processing the packet according to the assigned extended priority profile.

15. A method according to claim 14, wherein processing the packet according to the assigned extended priority profile includes:

selecting one of a plurality of queues based on the assigned extended priority profile, each queue of the plurality of queues corresponding to a different one of the possible extended priority profiles; and
sending the packet, a portion of the packet, or a packet descriptor associated with the packet to the selected queue.

16. A method according to claim 14, wherein assigning an extended priority profile to the packet includes:
assigning the extended priority profile from among a group of possible extended priority profiles that is larger than a combination of (i) a first group of possible priority profiles associated with the first priority field and (ii) a second group of possible priority profiles associated with the second priority field.

17. A method according to claim 14, wherein assigning an extended priority profile to the packet includes:
mapping the one or more bits of the first priority field of the packet and the one or more bits of the second priority field of the packet to the extended priority profile.

18. A method according to claim 14, wherein assigning an extended priority profile to the packet includes:
assigning an extended priority profile that corresponds to a priority level indicated by a first set of one or more bits distributed among at least one of (i) the one or more bits of the first priority field of the packet and (ii) the one or more bits of the second priority field of the packet, and
a priority sub-level indicated by a second set of one or more bits distributed among at least one of (i) the one or more bits of the first priority field of the packet and (ii) the one or more bits of the second priority field of the packet.

19. A method according to claim 14, wherein:
receiving a packet from the network includes receiving an Ethernet packet from the network; and
identifying the packet as a double VLAN tagged packet includes identifying the Ethernet packet as one of (i) a TRILL packet, (ii) an SPB packet, or (iii) an IEEE 802.1ad packet.

* * * * *